US012665258B2

(12) United States Patent
Cheng et al.

(10) Patent No.: US 12,665,258 B2
(45) Date of Patent: Jun. 23, 2026

(54) SEPARATOR, PREPARATION METHOD THEREFOR AND RELATED SECONDARY BATTERY, BATTERY MODULE, BATTERY PACK AND DEVICE

(71) Applicant: CONTEMPORARY AMPEREX TECHNOLOGY (HONG KONG) LIMITED, Hong Kong (CN)

(72) Inventors: Cong Cheng, Ningde (CN); Haiyi Hong, Ningde (CN); Yuanyuan Lan, Ningde (CN); Jianrui Yang, Ningde (CN); Na Liu, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 52 days.

(21) Appl. No.: 17/942,031

(22) Filed: Sep. 9, 2022

(65) Prior Publication Data

US 2023/0016626 A1     Jan. 19, 2023

Related U.S. Application Data

(63) Continuation of application No. PCT/CN2020/132950, filed on Nov. 30, 2020.

(51) Int. Cl.
*H01M 50/449* (2021.01)
*H01M 50/403* (2021.01)
(Continued)

(52) U.S. Cl.
CPC ....... *H01M 50/446* (2021.01); *H01M 50/403* (2021.01); *H01M 50/491* (2021.01); *H01M 50/494* (2021.01)

(58) Field of Classification Search
CPC ............. H01M 50/446; H01M 50/403; H01M 50/491; H01M 50/494; H01M 50/451;
(Continued)

(56) References Cited

U.S. PATENT DOCUMENTS 10,868,289 B2    12/2020  Huang et al.
11,814,483 B2    11/2023  Jeon et al.
(Continued)

FOREIGN PATENT DOCUMENTS

CN        102630353 A      8/2012
CN        103441230 A      12/2013
(Continued)

OTHER PUBLICATIONS

Machine translation of CN 109148798, retrieved from <www.espacenet.com> on Mar. 20, 2023.*
(Continued)

*Primary Examiner* — Cynthia K Walls
(74) *Attorney, Agent, or Firm* — K&L Gates LLP

(57) ABSTRACT

The present application relates to a separator in the electrochemical field and a preparation method therefor, and to a secondary battery comprising the separator, a device comprising the secondary battery. The separator of the present application is prepared by a simple process and has excellent heat resistance performance. Moreover, the secondary batteries and devices comprising the separator of the present application have good safety performance and cycling performance.

23 Claims, 6 Drawing Sheets

(51) Int. Cl.
    *H01M 50/446*    (2021.01)
    *H01M 50/491*    (2021.01)
    *H01M 50/494*    (2021.01)

(58) Field of Classification Search
    CPC ............. H01M 50/209; H01M 50/414; H01M
            50/431; H01M 50/443; H01M 2220/20;
                  H01M 2220/30; Y02E 60/10
    See application file for complete search history.

(56) References Cited

U.S. PATENT DOCUMENTS

| | | | |
|---|---|---|---|
| 2006/0019153 A1 | 1/2006 | Imachi et al. | |
| 2006/0019154 A1 | 1/2006 | Imachi et al. | |
| 2010/0196750 A1 | 8/2010 | Kajita et al. | |
| 2011/0311870 A1 | 12/2011 | Wakizaka et al. | |
| 2012/0107690 A1* | 5/2012 | Wakizaka | H01M 4/13 |
| | | | 252/500 |
| 2013/0017431 A1 | 1/2013 | Frisk et al. | |
| 2013/0244116 A1 | 9/2013 | Watanabe et al. | |
| 2014/0255796 A1 | 9/2014 | Matsuoka et al. | |
| 2015/0140402 A1 | 5/2015 | Kim et al. | |
| 2015/0188108 A1 | 7/2015 | Miyazawa et al. | |
| 2015/0240039 A1 | 8/2015 | Katsuda et al. | |
| 2015/0280197 A1 | 10/2015 | Zhao et al. | |
| 2015/0295216 A1* | 10/2015 | Okuno | H02J 7/0068 |
| | | | 320/128 |
| 2016/0141575 A1 | 5/2016 | Sasaki et al. | |
| 2017/0149040 A1 | 5/2017 | Suzuki | |
| 2017/0288192 A1 | 10/2017 | Chen et al. | |
| 2019/0198840 A1 | 6/2019 | Huang et al. | |
| 2019/0280274 A1 | 9/2019 | Kim et al. | |
| 2021/0005858 A1* | 1/2021 | Kim | H01M 4/625 |
| 2021/0184311 A1* | 6/2021 | Lefebvre | H01G 11/52 |
| 2021/0320379 A1 | 10/2021 | Kwon et al. | |
| 2022/0123433 A1 | 4/2022 | Taguchi et al. | |
| 2022/0285722 A1 | 9/2022 | Sung et al. | |

FOREIGN PATENT DOCUMENTS

| | | | |
|---|---|---|---|
| CN | 103515564 A | 1/2014 | |
| CN | 103904276 A | 7/2014 | |
| CN | 104064707 A | 9/2014 | |
| CN | 104659311 A | 5/2015 | |
| CN | 105958000 A | 9/2016 | |
| CN | 107895765 A | 4/2018 | |
| CN | 109037555 A | 12/2018 | |
| CN | 109148798 A | 1/2019 | |
| CN | 109950451 A | 6/2019 | |
| CN | 109980164 A | 7/2019 | |
| CN | 110233223 A | 9/2019 | |
| CN | 111192999 A | 5/2020 | |
| CN | 111244365 A | 6/2020 | |
| CN | 111492507 A | 8/2020 | |
| CN | 111554860 A | 8/2020 | |
| CN | 111653717 A | 9/2020 | |
| CN | 111668427 A | 9/2020 | |
| CN | 111682149 A | 9/2020 | |
| CN | 111954943 A | 11/2020 | |
| CN | 113363672 A | 9/2021 | |
| CN | 117397109 A | 1/2024 | |
| EP | 2485295 A1 | 8/2012 | |
| EP | 3704749 A1 | 9/2020 | |
| JP | 2010238448 A | 10/2010 | |
| JP | 2013008481 A | 1/2013 | |
| JP | 2018050833 A | 4/2018 | |
| JP | 2018053043 A | 4/2018 | |
| JP | 2018147578 A | 9/2018 | |
| JP | 2019133934 A | 8/2019 | |
| JP | 2019160792 A | 9/2019 | |
| JP | 2022552622 A | 12/2022 | |
| KR | 1020120091028 A | 8/2012 | |
| KR | 20130099592 A | 9/2013 | |
| KR | 20140037660 A | 3/2014 | |
| KR | 20140125352 A | 10/2014 | |
| KR | 1020150020667 A | 2/2015 | |
| KR | 20150040239 A | 4/2015 | |
| KR | 20150131005 A | 11/2015 | |
| KR | 20160118979 A | 10/2016 | |
| KR | 102181313 B | 11/2016 | |
| KR | 20170102876 A | 9/2017 | |
| KR | 101838337 B1 | 3/2018 | |
| KR | 1020190102572 A | 9/2019 | |
| KR | 1020200045790 A | 5/2020 | |
| KR | 1020200081442 A | 7/2020 | |
| KR | 102582604 B1 | 9/2023 | |
| WO | 2011040562 A1 | 4/2011 | |
| WO | 2013080946 A1 | 6/2013 | |
| WO | 2016017066 A1 | 2/2016 | |
| WO | 2018034094 A1 | 2/2018 | |
| WO | 2019089492 A1 | 5/2019 | |
| WO | WO 2019/089492 * | 5/2019 | ........ H01M 10/0525 |
| WO | 2019164130 A1 | 8/2019 | |
| WO | 2019192475 A1 | 10/2019 | |
| WO | 2019242016 A1 | 12/2019 | |
| WO | 2020142702 A1 | 7/2020 | |
| WO | 2020175079 A1 | 9/2020 | |
| WO | WO2020175292 A1 | 9/2020 | |
| WO | WO2020195988 A1 | 10/2020 | |

OTHER PUBLICATIONS

Contemporary Amperex Technology Co., Ltd, Notice of Preliminary Rejection, KIPO, KR-1020227029849, Jan. 11, 2023, 14 pgs.

Contemporary Amperex Technology Co., Limited, International Search Report and Written Opinion, PCT/CN2020/132950, Aug. 26, 2021, 16 pgs.

Contemporary Amperex Technology Co., Ltd, Extended European Search Report, EP20963110.0, May 3, 2023, 9 pgs.

Notice of Reasons for Refusal, JP2022-553658, Mar. 7, 2023, 8 pgs.

Eunice K Wong et al: "Battery Separator Characterization and Evaluation Procedures for NASA's Advanced Lithium-Ion Batteries" May 1, 2010 (May 1, 2010), National Aeronautics and Space Administration, 70 pgs.

F. Pennella F. et al:"A Survey of Methods for the Evaluation of Tissue Engineering Scaffold Permeability", Annals of Biomedical Engineering, vol. 41, No. 10, Published on line Apr. 24, 2013, 15 pgs.

Notice of Allowance issued on Sep. 4, 2023, in corresponding Japanese patent Application No. 2022-553658, 6 pages.

Cancellation of utility model registration received in the corresponding Korean Patent No. 10-2536847, mailed Dec. 4, 2023.

Third Party Submission received in the corresponding European Application 20963111.8, mailed Feb. 8, 2024.

Cancellation of utility model registration received in the corresponding Korean Patent No. 10-2537203, mailed Nov. 23, 2023.

Third Party Submission received in the corresponding European Application 20963115.9, mailed Feb. 16, 2024.

Cancellation of utility model registration received in the corresponding Korean Patent No. 10-2582604, mailed Feb. 26, 2024.

The first office action received in the corresponding Chinese application 202080102481.0, mailed on Jun. 4, 2024.

The written opinion of ISA received in the counterpart international application PCT/CN2020/132955, mailed on Aug. 30, 2021.

The First Office Action received in the counterpart Chinese application 202080103010.1, mailed on Jun. 4, 2024.

The international search report received in the counterpart international application PCT/CN2020/132952, mailed on Jun. 24, 2021.

The written opinion of ISA received in the counterpart international application PCT/CN2020/132952, mailed on Jun. 24, 2021.

The First Office Action received in the counterpart Chinese application 202080083061.2, mailed on May 8, 2023.

The First Notice of Reasons for Refusal received in the counterpart Japanese application 2022-552619, mailed on Mar. 6, 2023.

The Final Office Action received in the counterpart U.S. Appl. No. 17/950,978, mailed on Jun. 7, 2023.

The Non-Final Office Action received in the counterpart U.S. Appl. No. 17/950,978, mailed on Feb. 28, 2023.

(56)  References Cited

OTHER PUBLICATIONS

The extended European search report received in the counterpart European application 20963112.6, mailed on Oct. 11, 2024.

The extended European search report received in the counterpart European application 20963111.8, mailed on May 3, 2023.

Eunice K Wong et al: "Battery Separator Characterization and Evaluation Procedures for NASA's Advanced Lithium-Ion Batteries", May 1, 2010 (May 1, 2010), XP055608606.

The First Office Action received in the counterpart Chinese application 202080095489.9, mailed on May 9, 2023.

Notification to Grant Patent Right for Invention received in the counterpart Chinese application 202080095489.9, mailed on Jan. 2, 2024.

The extended European search report received in the counterpart European application 20963115.9, mailed on May 3, 2023.

The Notice of Preliminary Rejection received in the counterpart Korean application 10-2022-7030299, mailed on Dec. 22, 2022.

The Final Office Action received in the counterpart U.S. Appl. No. 17/942,029, mailed on Nov. 19, 2024.

The Non-Final Office Action received in the counterpart U.S. Appl. No. 17/942,029, mailed on Sep. 4, 2024.

The Second Notice of Reasons for Refusal received in the counterpart Japanese application 2022-552619, mailed on Aug. 7, 2023.

The international search report received in the counterpart international application PCT/CN2020/132955, mailed on Aug. 30, 2021.

Nicolas Fedelich: "Application Handbook Thermal Analysis of Polymers Selected Applications Thermal Analysis", Jan. 1, 2013 (Jan. 1, 2013).

The First Notice of Reasons for Refusal received in the counterpart Japanese application 2022-552622, mailed on Mar. 6, 2023.

The Second Notice of Reasons for Refusal received in the counterpart Japanese application 2022-552622, mailed on Aug. 7, 2023.

The First Notice of Reasons for Refusal received in the counterpart Japanese application 2024-034011, mailed on Oct. 21, 2024.

The Non-Final Office Action received in the counterpart U.S. Appl. No. 17/942,029, mailed on Mar. 22, 2023.

* cited by examiner

B

A

B

A

B

5

<u>5</u>

SEPARATOR, PREPARATION METHOD THEREFOR AND RELATED SECONDARY BATTERY, BATTERY MODULE, BATTERY PACK AND DEVICE

CROSS-REFERENCE TO RELATED APPLICATION

This application is a continuation application of PCT Patent Application No. PCT/CN2020/132950, entitled "SEPARATOR, PREPARATION METHOD THEREFOR AND RELATED SECONDARY BATTERY, BATTERY MODULE, BATTERY PACK AND DEVICE" filed on Nov. 30, 2020, which is incorporated herein by reference in its entirety.

This application is related to U.S. patent application Ser. No. 17/950,978, entitled "SEPARATOR, PREPARATION METHOD THEREFOR AND RELATED SECONDARY BATTERY, BATTERY MODULE, BATTERY PACK AND DEVICE" filed on Sep. 22, 2022, which is incorporated herein by reference in its entirety.

This application is related to U.S. patent application Ser. No. 17/942,029, entitled "SEPARATOR, SECONDARY BATTERY COMPRISING SAME AND RELATED BATTERY MODULE, BATTERY PACK AND DEVICE" filed on Sep. 9, 2022, which is incorporated herein by reference in its entirety.

This application is related to U.S. patent application Ser. No. 17/940,913, entitled "SEPARATOR, PREPARATION METHOD THEREFOR AND RELATED SECONDARY BATTERY, BATTERY MODULE, BATTERY PACK AND DEVICE" filed on Sep. 8, 2022, which is incorporated herein by reference in its entirety.

TECHNICAL FIELD

The present application relates to a separator in the electrochemical field and a preparation method therefor, and to a secondary battery comprising the separator, as well as a related battery module, battery pack, and device.

BACKGROUND ART

Secondary batteries are widely used in various consumer electronic products and electric vehicles due to their outstanding features, such as a light weight, no pollution and no memory effect.

With the continuous development in the new energy industry, higher requirements for the use of secondary batteries have been proposed by costumers. For example, the energy density of secondary batteries is designed to be higher and higher; however, the increase of the energy density of the battery is often detrimental to balancing dynamic performance, electrochemical performance, or safety performance, etc.

Therefore, it is a key challenge in the field of battery design to create batteries with both high cycling performance and high safety performance.

SUMMARY OF THE INVENTION

An object of the present application is to provide a separator, which aims to enable a secondary battery comprising the separator to have better cycling performance and safety performance.

In order to achieve the above object, in a first aspect, the present application, provides a separator, comprising: a substrate and a coating provided on at least one surface of the substrate, wherein the coating comprises inorganic particles and organic particles; the organic particles comprising first organic particles embedded in the inorganic particles and forming protrusions on the surface of the coating, wherein the first organic particles are secondary particles and have a number-average particle size of ≥13 μm and an area coverage on the coating surface of ≤10%.

Compared with the prior art, the present application comprises at least the following beneficial effects.

The separator of the present application comprises inorganic particles and first organic particles in the same coating, moreover, the first organic particles are specially designed, with a combination of the two aspects, the battery can combine a higher energy density with both good cycling performance and safety performance.

In any embodiment of the present application, the area coverage of the first organic particles on the coating surface is 0.5%-8%; optionally 0.8%-5%. When the area coverage of the first organic particles is within the given range, the cycling performance and safety performance of the battery can be further improved.

In any embodiment of the present application, the first organic particles have a number-average particle size of 15 μm-25 μm. When the number-average particle size of the first organic particles is within the given range, the cycling performance and safety performance of the battery can be further improved.

In any embodiment of the present application, the first organic particles comprise one or more of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and modified compounds of these homopolymers or copolymers.

In any embodiment of the present application, the first organic particles comprise one or more of polytetrafluoroethylene, polychlorotrifluoroethylene, polyvinyl fluoride, polyvinylidene fluoride, polyethylene, polypropylene, polyacrylonitrile, polyethylene oxide, a copolymer of different fluorine-containing olefine monomeric units, a copolymer of a fluorine-containing olefine monomeric unit and an ethylene monomeric unit, a copolymer of a fluorine-containing olefine monomeric unit and an acrylic monomeric unit, a copolymer of a fluorine-containing olefine monomeric unit and an acrylate monomeric unit, and modified compounds of these homopolymers or copolymers.

In any embodiment of the present application, the first organic particles comprise one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of these copolymers.

In any embodiment of the present application, the mass percentage of the first organic particles in the coating is ≥12%, in some embodiments, the mass percentage of the first organic particles in the coating is 15%-25%.

In any embodiment of the present application, the mass percentage of the inorganic particles in the coating is ≤80%, in some embodiments, the mass percentage of the inorganic particles in the coating is 65%-75%.

In any embodiment of the present application, the coating further comprises second organic particles embedded in the inorganic particles and forming protrusions on the surface of the coating, and the second organic particles are primary particles.

In any embodiment of the present application, the second organic particles have a number-average particle size of 2 $\mu$m-8 $\mu$m; in some embodiments, the second organic particles have a number-average particle size of 2.5 $\mu$m-6 $\mu$m.

In any embodiment of the present application, the mass percentage of the second organic particles in the coating is less than that of the first organic particles in the coating.

In any embodiment of the present application, the mass percentage of the second organic particles in the coating is $\leq$8%; in some embodiments, the mass percentage of the second organic particles in the coating is 2%-6%.

In any embodiment of the present application, the sum of the area coverages of the first organic particles and the second organic particles on the coating surface is $\leq$15%; in some embodiments, the sum of the area coverages of the first organic particles and the second organic particles on the coating surface is 1%-8%.

In any embodiment of the present application, the ratio in area coverage of the first organic particles to the second organic particles on the coating surface is 1:1-20:1; optionally 2:1-10:1.

In any embodiment of the present application, the second organic particles comprise one or more of a homopolymer or copolymer of an acrylate monomeric unit, a homopolymer or copolymer of an acrylic monomeric unit, a homopolymer or copolymer of a styrene monomeric unit, a polyurethane compound, a rubber compound, and modified compounds of these homopolymers or copolymers.

In any embodiment of the present application, the second organic particles comprise one or more of a copolymer of an acrylate monomeric unit and a styrene monomeric unit, a copolymer of an acrylic monomeric unit and a styrene monomeric unit, a copolymer of an acrylic monomeric unit, an acrylate monomeric unit and a styrene monomeric unit, a copolymer of a styrene monomeric unit and an unsaturated nitrile monomeric unit, a copolymer of a styrene monomeric unit, an olefine monomeric unit and an unsaturated nitrile monomeric unit, and modified compounds of these copolymer.

In any embodiment of the present application, the second organic particles comprise one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of the above copolymers.

In any embodiment of the present application, the inorganic particles comprise one or more of boehmite ($\gamma$-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$).

In any embodiment of the present application, the separator has an air permeability of 100 s/100 mL-300 s/100 mL, in some embodiments, the separator has an air permeability of 150 s/100 mL-250 s/100 mL.

In any embodiment of the present application, the separator has a transverse tensile strength (Machine Direction, MD) of 1500 kgf/cm$^2$-3000 kgf/cm$^2$; in some embodiments, the separator has a transverse tensile strength of 1800 kgf/cm$^2$-2500 kgf/cm$^2$.

In any embodiment of the present application, the separator has a longitudinal tensile strength (Transverse Direction, TD) of 1000 kgf/cm$^2$-2500 kgf/cm$^2$; in some embodiments, the separator has a longitudinal tensile strength of 1400 kgf/cm$^2$-2000 kgf/cm$^2$.

In any embodiment of the present application, the separator has a transverse elongation at break of 50%-200%; in some embodiments, the separator has a transverse elongation at break of 100%-150%.

In any embodiment of the present application, the separator has a longitudinal elongation at break of 50%-200%; in some embodiments, the separator has a longitudinal elongation at break of 100%-150%.

In any embodiment of the present application, the inorganic particles and the organic particles form a non-uniform pore structure in the coating.

In any embodiment of the present application, the spacing between any two adjacent inorganic particles is denoted as L1, and the spacing between any inorganic particle and an adjacent organic particle is denoted as L2, wherein L1<L2.

In a second aspect, the present application provides a method for preparing a separator, comprising at least the steps of:

(1) providing a substrate;

(2) providing a coating slurry, comprising a component material and a solvent, wherein the component material comprise inorganic particles and organic particles, and the organic particles comprise first organic particles;

(3) coating at least one side of the substrate from step (1) with the coating slurry from step (2), so as to form a coating, and drying same to obtain the separator; wherein the separator comprises: a substrate; and a coating formed on at least one surface of the substrate; the coating comprises inorganic particles and organic particles; the organic particles comprise first organic particles embedded in the inorganic particles and forming protrusions on the surface of the inorganic particle layer; the first organic particles are secondary particles, and have a number-average particle size of $\geq$13 $\mu$m and an area coverage on the coating surface of $\leq$10%.

In any embodiment of the present application, in step (2), the coating slurry further comprises second organic particles, and the second organic particles are primary particles.

In any embodiment of the present application, in step (2), the second organic particles is in a percentage of 8% or less of the total dry weight of the component material, optionally 2%-6%.

In any embodiment of the present application, in step (2), the first organic particles are added in a mass percentage of 12% or more of the total dry weight of the component material; optionally 12%-30%.

In any embodiment of the present application, in step (2), the coating slurry has a solid content of 28%-45%, optionally 30%-38%, based on the weight of the coating slurry.

In any embodiment of the present application, the coating is carried out by using a coating machine, wherein the coating machine comprises a gravure roll which has a number of lines of 100 LPI-300 LPI, optionally 125 LPI-190 LPI.

In any embodiment of the present application, in step (3), the coating is carried out at a speed of 30 m/min-90 m/min, optionally 50 m/min-70 m/min.

In any embodiment of the present application, in step (3), the coating is carried out at a line speed ratio of 0.8-2.5, optionally 0.8-1.5.

In any embodiment of the present application, in step (3), the drying is carried out at a temperature of 40° C. to 70° C., optionally 50° C. to 60° C.

In any embodiment of the present application, in step (3), the drying is carried out for a period of 10 s-120 s, optionally 20 s-80 s.

In a third aspect, the present application provides a secondary battery, comprising a separator of the first aspect of the present application or a separator prepared by the method according to the second aspect of the present application.

In a fourth aspect, the present application provides a battery module, comprising a secondary battery of the third aspect of the present application.

In a fifth aspect, the present application provides a battery pack, comprising a battery module of the fourth aspect of the present application.

In a sixth aspect, the present application provides a device, comprising at least one of a secondary battery of the third aspect of the present application, a battery module of the fourth aspect of the present application, or a battery pack of the fifth aspect of the present application.

BRIEF DESCRIPTION OF THE DRAWINGS

In order to illustrate the technical solutions of the present application more clearly, the drawings used in the present application will be described briefly below. Apparently, the drawings described below are merely some embodiments of the present application, and those of ordinary skill in the art may derive other drawings from these drawings without creative efforts.

FIG. 2 is a scanning electron microscope (SEM) picture in an embodiment of a separator of the present application.

FIG. 4-1 is a structural schematic diagram of an embodiment of a separator of the present application.

FIG. 4-2 is a structural schematic diagram of a further embodiment of a separator of the present application.

DETAILED DESCRIPTION OF EMBODIMENTS

Figure 1:
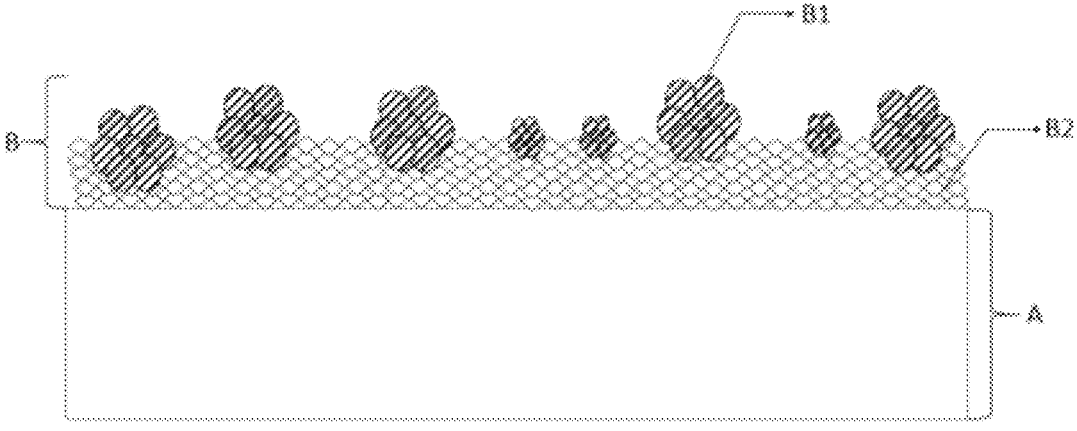
FIGS. 1-1 and 1-2 are structural schematic diagrams of a coating in an embodiment of a separator of the present application.

The present application will be further described below in conjunction with specific embodiments. It should be understood that these specific embodiments are merely intended to illustrate the present application but not to limit the scope of the present application.

For the sake of brevity, only certain numerical ranges are specifically disclosed herein. However, any lower limit may be combined with any upper limit to form a range that is not explicitly described; and any lower limit may be combined with any other lower limit to form an unspecified range, and any upper limit likewise may be combined with any other upper limit to form an unspecified range. Furthermore, each individually disclosed point or single value itself may serve as a lower or upper limit in combination with any other point or single value or with other lower or upper limit to form an unspecified range.

In the description herein, it should be noted that, unless otherwise stated, the recitation of numerical ranges by "no less than" and "no more than" include all numbers within that range including the endpoints, the recitation of "more" in the phrase "one or more" comprises two or more.

In the description herein, unless otherwise stated, the term "or" is inclusive. That is to say, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

Unless otherwise stated, the terms used in the present application have the meaning well-known to a person skilled in the art. Unless otherwise stated, the values of the parameters mentioned in the present application may be measured by various measurement methods commonly used in the art (for example, may be measured according to the method illustrated in the examples of the present application).

Unless otherwise stated, the operations in the present application are carried out at room temperature and atmospheric pressure.

Secondary Battery

A secondary battery, refers to a battery which can continue to be used by activating the active material by means of charging after the battery is discharged.

Generally, the secondary battery comprises a positive electrode plate, a negative electrode plate, a separator and an electrolyte. During the charge/discharge process of the battery, active ions are intercalated and de-intercalated back and forth between the positive electrode plate and the negative electrode plate. The separator is provided between the positive electrode plate and the negative electrode plate, and functions for separation. The electrolyte is located between the positive electrode plate and the negative electrode plate and functions for ionic conduction.

[Separator]

The separator provided in the present application comprises: a substrate and a coating provided on at least one surface of the substrate. The coating comprises inorganic particles and organic particles. The organic particles comprising first organic particles embedded in the inorganic particles and forming protrusions on the surface of the coating, wherein the first organic particles are secondary particles and have a number-average particle size of ≥13 μm. The area coverage of the first organic particles on the coating surface is ≤10%.

It should be noted that the number-average particle size of the organic particles refers to the arithmetic mean of the particle size of the organic particles counted according to the number of the organic particles in the coating of the separator. The particle size of the organic particle refers to the distance between two points on the organic particles that are farthest apart.

The area coverage of the organic particles on the coating surface refers to the ratio of the area of the organic particles in relative to the total area of the coating.

Without wishing to be bound by any theory, the separator of the present application comprises inorganic particles and specific first organic particles in the same coating, which greatly reduces the overall thickness of the separator, compared to a separator comprising two coatings, i.e., an inorganic particles layer and an organic particles layer, thus improving the energy density of the battery; in addition, the organic particles and inorganic particles form a specific coating structure, enabling the formation of sufficient and non-uniformly distributed pore structures between the inorganic particles and the organic particles, which can ensure the unblocked ion transmission channels, such that the battery has good cycling performance; meanwhile, when the area coverage of the first organic particles on the coating surface is within the given range, and the battery is in a normal working environment (for example, 45° C. or less), the formation of a dense adhesive film from the swelling of the first organic particles in the coating in the electrolyte can be effectively avoided, which ensures that the separator has moderate voids, facilitating the ion transmission, thereby further improving the cycling performance of the battery; especially, when the battery is in a high-temperature operation environment (for example, 100° C. or more), the first organic particles with a specific area coverage will form a suitable adhesive film structure at a high temperature, which will quickly reduce the ion diffusion channels and delay the thermal propagation time, thereby effectively improving the safety performance of the battery.

As shown in FIG. 1-1, the separator comprises a substrate (A) and a coating (B), the coating (B) comprising first organic particles (B1) and inorganic particles (B2), wherein the first organic particles (B1) are secondary particles, and the first organic particles are embedded in an inorganic particle layer formed from the inorganic particles (B2) and form protrusions on the surface of the inorganic particle layer (B).

By the intensive study, the applicants have found that on the basis that the separator of the present application satisfies the design conditions, if one or more of the following conditions are also optionally satisfied, the performance of the secondary battery can be further improved.

In some embodiments, the area coverage of the first organic particles on the coating surface is 0.5%-10%, optionally 0.5%-8%; for example, the area coverage of the first organic particles on the coating surface can be 0.5-7%, 0.5%-5%, 0.5%-3%, 0.8%-10%, 0.8%-8%, 0.8%-6%, 0.8%-5%, 0.8%-2.5%, 1%-8%, 1%-6%, 1%-3%, 1.5%-10%, 1.5%-5.5%, 1.5%-3.5%, 1.5%-2.5%, 1.8%-5.5%, 1.8%-3.5%, 2%-10%, and 4%-8%. When the area coverage of the first organic particles on the coating surface is within the given range, the cycling performance and safety performance of the battery can be further improved.

In some embodiments, the first organic particles can have a number-average particle size of 15 μm-25 μm. When the number-average particle size of the first organic particles is within the given range, the organic particles are enabled to have sufficient voids therebetween; even though the organic particles swell in the electrolyte, sufficient ion transmission channels can be formed, thereby further improving the cycling performance of the battery.

The number-average particle size of the organic particles refers to the arithmetic mean of the particle size of the organic particles counted according to the number of the organic particles in the coating of the separator.

In some embodiments, the first organic particles comprise one or more of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and modified compounds of these homopolymers or copolymers.

In some embodiments, the fluorine-containing olefine monomeric unit can be selected from one or more of difluoroethylene, vinylidene fluoride, trifluoroethylene, chlorotrifluoroethylene, tetrafluoroethylene, and hexafluoropropylene.

In some embodiments, the olefine monomeric unit can be selected from one or more of ethylene, propylene, butadiene, isoprene, etc.

In some embodiments, the unsaturated nitrile monomeric unit can be selected from one or more of acrylonitrile, methylacrylonitrile, etc.

In some embodiments, the alkylene oxide monomeric unit can be selected from one or more of ethylene oxide, propylene oxide, etc.

In some embodiments, the first organic particles comprise one or more of polytetrafluoroethylene, polychlorotrifluoroethylene, polyvinyl fluoride, polyvinylidene fluoride, polyethylene, polypropylene, polyacrylonitrile, polyethylene oxide, a copolymer of different fluorine-containing olefine monomeric units, a copolymer of a fluorine-containing olefine monomeric unit and an ethylene monomeric unit, a copolymer of a fluorine-containing olefine monomeric unit and an acrylic monomeric unit, a copolymer of a fluorine-containing olefine monomeric unit and an acrylate monomeric unit, and modified compounds of these homopolymers or copolymers.

In some embodiments, the first organic particles comprise one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of these copolymers.

In some embodiments, the first organic particles have a number average molecular weight of 300000-800000, for example, 400000-650000.

In some embodiments, the inorganic particles can comprise one or more of boehmite ($\gamma$-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$); for example, the inorganic particles can comprise one or more of boehmite ($\gamma$-AlOOH), and aluminum oxide ($Al_2O_3$).

In some embodiments, the inorganic particles have a volume-average particle size $Dv_{50} \leq 2.5$ μm; for example, the inorganic particles can have a volume-average particle size of 0.5 μm-2.5 μm, 1.5 μm-2.5 μm, 0.3 μm-0.7 μm, etc. When the volume-average particle size of the inorganic particles is controlled within the given range, the volume energy density of the battery can be further improved while ensuring better cycling performance and safety performance of the separator.

In some embodiments, the mass percentage of the first organic particles in the coating is ≥12%; for example, the mass percentage of the first organic particles in the coating is 12%-30%, 15%-25%.

In some embodiments, the mass percentage of the inorganic particles in the coating is ≤80%; for example, the mass percentage of the inorganic particles in the coating is 65%-75%.

By selecting suitable contents of the first organic particles and the inorganic particles, a better synergistic effect of the two types of particles can be achieved, ensuring that the separator further has a suitable pore structure while ensuring the safety performance, and at the same time achieves a light-weight separator, thereby further improving the energy density of the battery.

In some embodiments, the coating further comprises second organic particles embedded in the inorganic particles and forming protrusions on the surface of the coating, and the second organic particles are primary particles. When the coating further comprises the second organic particles, the safety performance of the battery can be further improved.

It should be noted that the organic particle morphology (primary particles and secondary particles) has a meaning well-known in the art. The primary particles refer to particles that do not form an agglomerated state. A secondary particle refers to a particle in an agglomerated state formed by the aggregation of two or more primary particles.

Figures 1, 2:
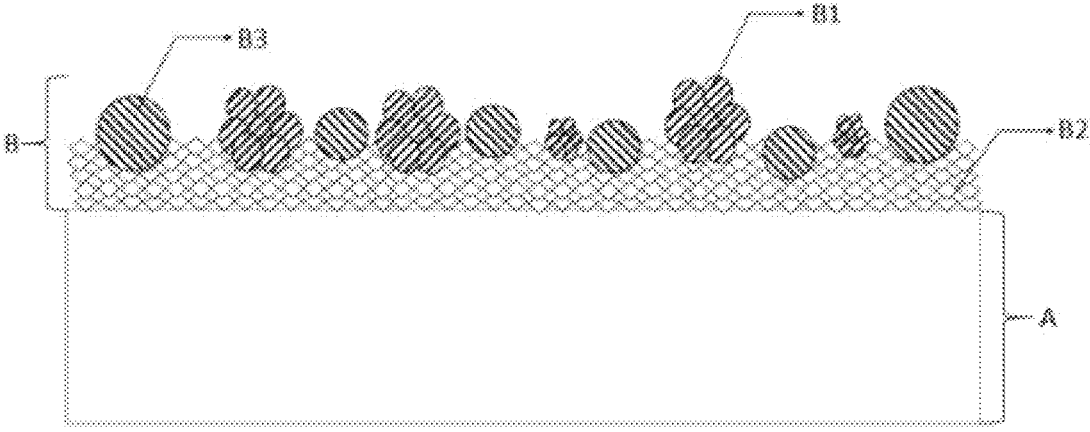
Figure 2:
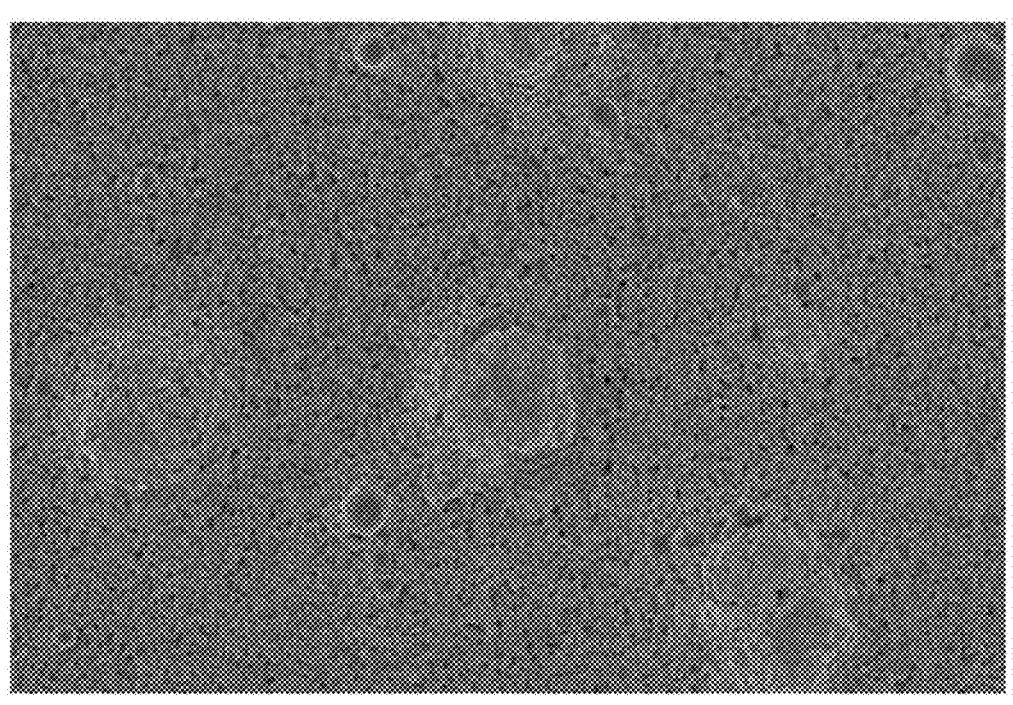

As shown in FIG. 1-2, the separator comprises a substrate (A) and a coating (B), the coating (B) comprising first organic particles (B1), inorganic particles (B2) and second organic particles (B3), wherein the first organic particles (B1) are secondary particles, the second organic particles (B3) are primary particles, and the first organic particles (B1) and the second organic particles (B3) are both embedded in an inorganic particle layer formed from the inorganic particles (B2) and form protrusions on the surface of the inorganic particle layer.

In some embodiments, the second organic particles have a number-average particle size of 2 μm-8 μm; for example, the second organic particles can have a number-average particle size of 2.5 μm-8 μm, 2.5 μm-6 μm, and 3.0 μm-5.5 μm. The inventors have found that when the number-average particle size of the second organic particles is within the given range, the cycling performance and safety performance of the battery can be further improved. It have been found by the inventors through a lot of studies that if the number-average particle size of the second organic particles is too small (for example, less than 2 μm), the particles will easily swell in the electrolyte to form an adhesive film structure, which will block the ion transmission channel during the normal operation of the battery, thereby affecting the cycling performance of the battery; if the number-average particle size of the second organic particles is too large (for example, more than 8 μm), the particles will result in over-bonding between the separator and the electrode plate after thermal pressing process for the preparation of the battery, causing poor electrolyte infiltration, thereby affecting the cycling performance of the battery.

In some embodiments, the second organic particles comprise one or more of a homopolymer or copolymer of an acrylate monomeric unit, a homopolymer or copolymer of an acrylic monomeric unit, a homopolymer or copolymer of a styrene monomeric unit, a polyurethane compound, a rubber compound, and modified compounds of these homopolymers or copolymers.

In some embodiments, the second organic particles comprise one or more of a copolymer of an acrylate monomeric unit and a styrene monomeric unit, a copolymer of an acrylic monomeric unit and a styrene monomeric unit, a copolymer of an acrylic monomeric unit, an acrylate monomeric unit and a styrene monomeric unit, a copolymer of a styrene monomeric unit and an unsaturated nitrile monomeric unit, a copolymer of a styrene monomeric unit, an olefine monomeric unit and an unsaturated nitrile monomeric unit, and modified compounds of these copolymer.

In some embodiments, the acrylate monomeric unit can be selected from one or more of methyl acrylate, ethyl acrylate, propyl acrylate, butyl acrylate, methyl methacrylate, butyl methacrylate, isooctyl methacrylate, etc.

In some embodiments, the acrylic monomeric unit can be selected from one or more of acrylic acid, methacrylic acid, etc.

In some embodiments, the styrene monomeric unit can be selected from one or more of styrene, methylstyrene, etc.

In some embodiments, the unsaturated nitrile monomeric unit can be selected from one or more of acrylonitrile, methylacrylonitrile, etc.

In some embodiments, the second organic particles comprise one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of the above copolymers.

A modified compound of the homopolymer or copolymer refers to a modified compound obtained by copolymerization of the monomeric units in the homopolymer or copolymer with monomeric units containing a specific functional group. For example, a fluorine-containing olefine monomeric unit can be copolymerized with a carboxyl functional group-containing compound to obtain a modified compound thereof, etc.

In some embodiments, the second organic particles have a number average molecular weight of 10000-100000, for example, 20000-80000.

In some embodiments, the mass percentage of the second organic particles in the coating is less than that of the first organic particles in the coating.

In some embodiments, the mass percentage of the second organic particles in the coating is ≤8%; for example, 2%-8%, 2%-6%, and 3%-6.5%.

In some embodiments, the sum of the area coverages of the first organic particles and the second organic particles on the coating surface is ≤20%, optionally ≤15%; in some embodiments, the sum of the area coverages of the first organic particles and the second organic particles on the coating surface is 1%-20%, 1%-16%, 1%-13%, 1%-8%, 2%-15%, 2%-10%, 2.5%-12%, 3%-18%, 3.5%-9%, 4.5%-15% and 4.5%-8%. When the sum of the area coverages of the first organic particles and the second organic particles on the coating surface is within the stated range, the cycling performance and safety performance of the battery can be further improved.

In some embodiments, the ratio of area coverage of the first organic particles to the second organic particles on the coating surface is 1:1-20:1; optionally 2:1-10:1 and 3:1-5:1. When the ratio is within the above range, the contents of the first organic particles and the second organic particles can be optimally matched, thereby further improving the energy density and the cycling performance of the battery. If the content of the first organic particles is too much, the energy density of the battery can be affected; if the content of the second organic particles is too much, the cycling performance of the battery can be affected.

According to some embodiments, the coating can further comprise other organic compounds, for example, a polymer that improve the heat resistance (referred to as "heat-resistant adhesive" for short), a dispersant, a wetting agent, other types of binders, etc. The above other organic compounds are all non-granular substances in the coating. In the present application, the above other organic compounds are not particularly limited, and can be selected from any well-known materials with well improved performance.

In the present application, the material of the substrate is not particularly limited, and can be selected from any well-known substrate with good chemical and mechanical stability, for example one or more of glass fibers, a non-woven fabric, polyethylene, polypropylene, and polyvinylidene fluoride. The substrate can be a single-layer film, or a multi-layer composite film. When the substrate is a multi-layer composite film, the materials of the respective layers may be the same or different.

In some embodiments, the substrate has a thickness of ≤10 μm; for example, the substrate can have a thickness of 5 μm-10 μm, 5 μm-9 μm, and 7 μm-9 μm. When the thickness of the substrate is controlled within the given range, the energy density of the battery can be further improved while ensuring the rate performance and safety performance of the battery.

In some embodiments, the separator has a single-sided coating weight per unit area of ≤3.0 g/m2; for example, the separator can have a single-sided coating weight per unit area of 1.5 g/m$^2$-3.0 g/m$^2$, 1.5 g/m$^2$-2.5 g/m$^2$, 1.8 g/m$^2$-2.3 g/m$^2$, etc. When the weight of single-sided coating on the separator per unit area is controlled within the given range, the energy density of the battery can be further improved while ensuring the cycling performance and safety performance of the battery.

In some embodiments, the separator can have an air permeability of 100 s/100 mL-300 s/100 mL; for example, the separator can have an air permeability of 150 s/100 mL-250 s/100 mL, 170 s/100 mL-220 s/100 mL.

In some embodiments, the separator can have a longitudinal tensile strength (TD) of 1000 kgf/cm$^2$-2500 kgf/cm$^2$; for example, the separator can have a longitudinal tensile strength of 1400 kgf/cm$^2$-2000 kgf/cm$^2$.

In some embodiments, the separator can have a longitudinal elongation at break of 50%-200%; for example, the separator can have a longitudinal elongation at break of 100%-150%.

In some embodiments, the separator can have a transverse tensile strength (MD) of 1500 kgf/cm$^2$–3000 kgf/cm$^2$; for example, the separator can have a transverse tensile strength of 1800 kgf/cm$^2$–2500 kgf/cm$^2$.

In some embodiments, the separator can have a transverse elongation at break of 50%-200%; for example, the separator can have a transverse elongation at break of 100%-150%.

In some embodiments, the inorganic particles and the organic particles form a non-uniform pore structure in the coating.

In some embodiments, the spacing between any two adjacent inorganic particles is denoted as L1, and the spacing between any inorganic particle and an adjacent organic particle is denoted as L2, wherein L1<L2.

Measuring Method for Related Parameters

According to some embodiments, the area coverage of the organic particles on the coating surface can be determined by an apparatus and method known in the art. As an example, the area coverage of the first organic particles on the coating surface can be measured according to the following method: a test sample with a size (for example, length×width=50 mm×100 mm) is randomly selected from the separator, and the area of the test sample is calculated and denoted as S; the SEM image of the test areas are obtained at a magnification (for example, 1000×) by using a scanning electron microscope (for example, ZEISS Sigma 300), for example, by referring to JY/T010-1996, and randomly selecting a plurality of (for example, 10) different test areas in the test sample.

When the organic particles in the test areas have a secondary particle morphology, the area of the organic particles are recorded (it should be noted that, when the organic particle is of an irregular shape, the organic particle can be circumscribed to form a circle, and the area of the circumscribed circle is served an area of the organic particle), the sum of the areas of the first organic particles in the test areas are calculated and denoted as S1. The area coverage of the first organic particles on the coating surface=S1/S×100%.

In order to ensure the accuracy of the test results, a plurality of (for example, 5) test samples can be used to repeat the measurement, and then an average value of the area coverages of the test samples is taken as the final measurement result.

The area coverage of the second organic particles can be measured by the same method as above.

FIG. 2 is a scanning electron microscope (SEM) picture of an embodiment of a separator of the present application. The area coverage of the organic particles on the coating surface can be calculated according to the method described above.

According to some embodiments, the particle size and number-average particle size of the organic particles can be measured by an apparatus and method known in the art. For example, a scanning electron microscope (for example, ZEISS Sigma 300) is used to obtain an SEM image of the separator, for example, by referring to JY/T010-1996. As an example, the measurement can be carried out as follows: a test sample with length×width=50 mm×100 mm is randomly selected from the separator and a plurality of (for example, 5) test areas are randomly selected on the test sample; at a magnification (for example, 500× when measuring the first organic particles and 1000× when measuring the second organic particles), the particle sizes (i.e., the distance between two points that are farthest apart is taken as the particle size of the organic particle) of the respective organic particles in the respective test areas are read, to be the particle sizes of the organic particles in the present application. The numbers and particle size values of the organic particles in the respective test areas are recorded, and the arithmetic mean of the particle sizes of the organic particles in the test areas are taken, as the number-average particle size of the organic particles in the test sample. In order to ensure the accuracy of the test results, the above measurement can be carried out on a plurality of (for example, 10) test samples, and an average value of the test samples is taken as the final test result.

According to some embodiments, the morphology of the organic particles can be determined by an apparatus and method known in the art. For example, a scanning electron microscope (for example, ZEISS Sigma 300) can be used for the determination. As an example, the following steps are performed: first, a separator is cut into a test sample with a size, (for example, 6 mm×6 mm), and the test sample is sandwiched by two electrically and thermally conductive sheets (for example, copper foils), and the test sample is sticked and fixed to the sheets by an adhesive (for example, a double-sided adhesive tape), and pressed with a flat iron block having a mass (for example, about 400 g) for a period of time (for example, 1 h), such that the gaps between the test sample and the copper foils are as small as possible, the edges are then trimmed using scissors; the test sample is sticked onto a sample stage with a conductive adhesive, with the sample slightly protruding from the edge of the sample stage. Then, the sample stage is mounted onto a sample holder and locked for fixation; the power of an argon ion cross section polisher (for example, IB-19500CP) is turned on for vacuumization (for example, 10 Pa-4 Pa); the argon flow rate (for example, 0.15 MPa) and voltage (for example, 8 KV) and polishing time (for example, 2 hours) are set, the sample stage is adjusted to a rocking mode to start the polishing; after the completion of the polishing, the ion-polished cross-sectional topography (CP) picture of the test sample is obtained by using a scanning electron microscope (for example, ZEISS Sigma 300).

Figure 3:
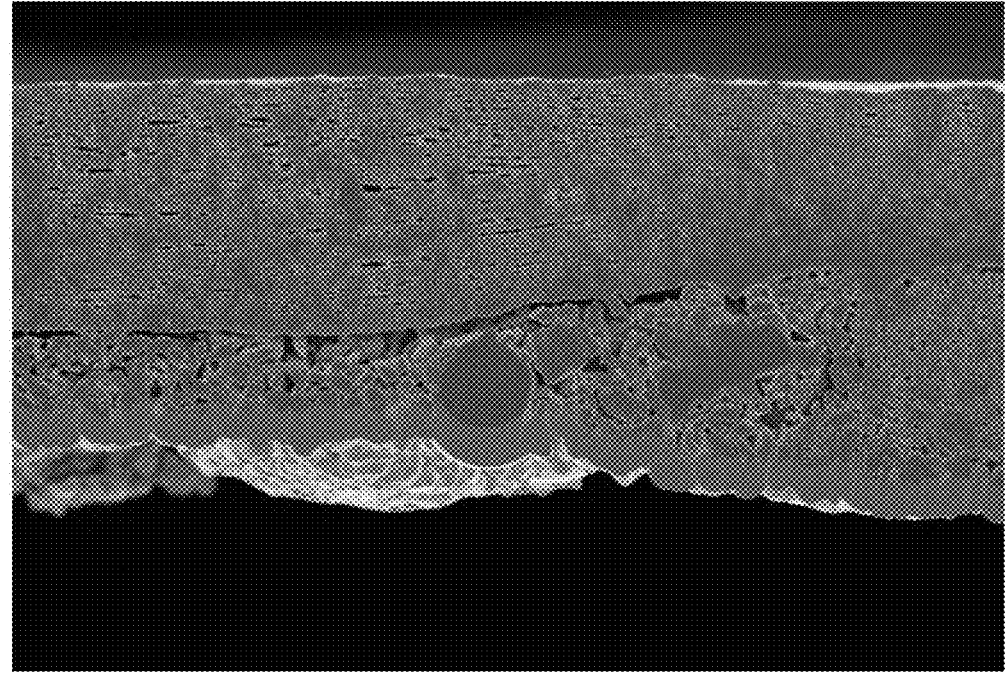
FIG. 3 is an ion-polished cross-sectional topography (cross-section polishing, CP) picture in an embodiment of a separator of the present application.

FIG. 3 are ion-polished cross-sectional topography (CP) pictures of separators in embodiments of the present application. It can be seen from FIG. 3 that, the coating of the separator comprises both the first organic particles and the second organic particles. The first organic particles are secondary particles composed of a plurality of primary particles and have an irregular non-solid spherical cross-section. The second organic particles are non-agglomerated primary particles and have a solid spherical cross-section.

According to some embodiments, the material type of the organic particles can be determined by an apparatus and method known in the art. For example, the infrared spectrum of the material can be measured, so as to determine the characteristic peaks contained therein, and thus to determine the material type. Specifically, the organic particles can be analyzed by infrared spectroscopy using instruments and methods known in the art, for example an infrared spectrometer, for example, be determined by an IS10 Fourier transform infrared spectrometer from Nicolet, USA, and according to the GB/T6040-2002 General rules for infrared spectrum analysis.

According to some embodiments, the volume-average particle size $Dv_{50}$ of the inorganic particles has the meaning well-known in the art, and can be determined by an instrument and method known in the art. For example, it can be determined by referring to GB/T 19077-2016 particle size distribution-laser diffraction method, using a laser particle size analyzer (for example, Master Size 3000).

According to some embodiments, the air permeability, transverse tensile strength (MD), longitudinal tensile strength (TD), transverse elongation at break, and longitudinal elongation at break of the separator all have meanings well-known in the art, and can be determined according to methods known in the art. For example, they can all be determined by referring to GB/T 36363-2018.

According to some embodiments, the spacing between any two adjacent inorganic particles is determined by randomly selecting two inorganic particles in the coating (when the inorganic particles are of an irregular shape, the particles can be circumscribed to form a circle) in the SEM image of the separator, and measuring the spacing between the centers of circles of the two inorganic particles as the spacing between the two inorganic particles, denoted as L1.

According to some embodiments, the spacing between any inorganic particle and an adjacent organic particle is determined by randomly selecting an inorganic particle and an organic particle in the coating (when the inorganic particle or organic particle are of an irregular shape, the particle can be circumscribed to form a circle) in the SEM image of the separator, and measuring the spacing between the centers of circles of the inorganic particle and the organic particle as the spacing between the inorganic particle and the organic particle, denoted as L2. The mentioned organic particle may be a first organic particle, or a second organic particle.

The spacing can be determined using an instrument known in the art. For example, it can be determined by a scanning electron microscope. As an example, the spacing L2 between any inorganic particle and an adjacent organic particle can be measured as follows: a separator is made into a test sample with length×width=50 mm×100 mm; the separator is measured using a scanning electron microscope (for example, ZEISS Sigma300). The measurement can be carried out by referring to JY/T010-1996. An area is randomly selected in the test sample for scanning, to obtain an SEM image of the separator under a certain magnification (for example, 3000×); in the SEM image, an inorganic particle and an adjacent organic particle are randomly selected (when the inorganic particle or organic particle is an irregular body, the particle can be circumscribed to form a circle), to measure the distance between the centers of circles of the inorganic particle (or the circumscribed circle thereof) and the organic particle (or the circumscribed circle thereof), as the spacing between the inorganic particle and adjacent organic particle of the present application, denoted as L2. In order to ensure the accuracy of the measurement results, a number of groups of adjacent particles (for example, 10 groups) can be selected in the test sample to repeat the measurement, and an average of the test results on the groups are taken as the final result.

Similarly, the spacing between any two adjacent inorganic particles L1 can also be measured according to the above method.

The present application also provides a method for preparing the above separator, comprising at least the steps of:

(1) providing a substrate;

(2) providing a coating slurry, comprising a component material and a solvent, wherein the component material comprise inorganic particles and organic particles, and the organic particles comprise first organic particles;

(3) coating at least one side of the substrate from step (1) with the coating slurry from step (2), so as to form a coating and drying same to obtain the separator; wherein the separator comprises: a substrate; and a coating formed on at least one surface of the substrate; the coating comprises inorganic particles and organic particles; the organic particles comprise first organic particles embedded in the inorganic particles and forming protrusions on the surface of the inorganic particle layer; and the first organic particles are secondary particles, have a number-average particle size of ≥13 μm and an area coverage on the coating surface of ≤10%.

The property and composition of the coating have the same meaning as that in the separator.

The coating can be provided on only one surface of the substrate, or on both surfaces of the substrate.

Figures 1, 4:
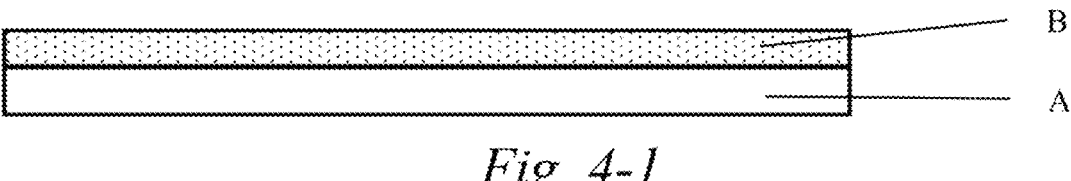
Figures 2, 4:
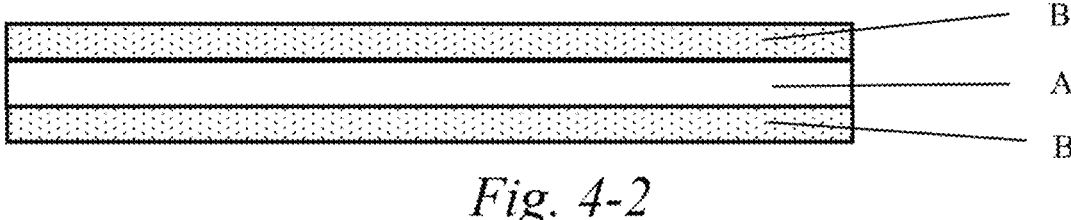

As shown in FIG. 4-1, the separator comprises a substrate (A) and a coating (B), and the coating (B) is provided on only one surface of the substrate (A).

As shown in FIG. 4-2, the separator comprises a substrate (A) and a coating (B), and the coating (B) is provided on both surfaces of the substrate (A) at the same time.

In an embodiment of the present application, the material of the substrate is not particularly limited, and can be selected from any well-known substrate with good chemical and mechanical stability, for example one or more of glass fibers, a non-woven fabric, polyethylene, polypropylene, and polyvinylidene fluoride. The substrate can be a single-layer film, or a multi-layer composite film. When the substrate is a multi-layer composite film, the materials of the respective layers may be the same or different.

In some embodiments, in step (2), the solvent can be water, for example, deionized water.

In some embodiments, in step (2), the component material also can comprise the aforementioned second organic particles. For the parameters of the second organic particles, reference can be made to the aforementioned content, and it will not be repeated here.

In some embodiments, in step (2), the component material also can comprise other organic compounds, for example, a polymer that improve the heat resistance, a dispersant, a wetting agent, other types of binders, etc. The above other organic compounds are all non-granular substances in the coating. In the present application, the above other organic compounds are not particularly limited, and can be selected from any well-known materials with well improved performance.

In some embodiments, in step (2), a component material is added to the solvent and stirred uniformly to obtain a coating slurry.

In some embodiments, in step (2), the first organic particles are added in a mass percentage of 12% or more of the total dry weight of the component material; for example, 12%-30%, 15%-30%, 15%-25%, 15%-20% and 16%-22%.

In some embodiments, in step (2), the second organic particles are added in a mass percentage of 8% or less of the total dry weight of the component material, for example, 2%-10%, 2%-6%, 3%-7% and 3%-5%.

It should be noted that, when the component material is in a solid state, the dry weight of the component material is the mass of the component material that is added. When the component material is in a suspension, an emulsion or a solution, the dry weight of the component material is a product of the mass of the component material that is added and the solid content of the component material. The total dry weight of the component material ingredients is the sum of the dry weights of the component material ingredients.

In some embodiments, in step (2), the solid content of the coating slurry can be controlled at 28%-45%, for example, 30%-38%, based on the wight of the coating slurry. When the solid content of the coating slurry is within the above range, the film surface problem of the coating can be effectively reduced and the probability of non-uniform coating can be reduced, thereby further improving the cycling performance and safety performance of the battery.

In some embodiments, in step (3), the coating is carried out by a coating machine.

In an embodiment of the present application, the model of the coating machine is not particularly limited, and a commercially available coating machine can be used.

In some embodiments, in step (3), the coating can be carried out by a process, such as transfer coating, rotary spraying, dip coating, etc.; for example, the coating is carried out by transfer coating.

In some embodiments, the coating machine comprises a gravure roller; and the gravure roller is used for transferring the coating slurry to the substrate.

In some embodiments, the gravure roller can have a number of lines of 100 LPI-300 LPI, for example, 125 LPI-190 LPI (LPI represents lines/inch). When the number of lines of the gravure roller is within the above range, it is helpful to control the number of the first organic particles and the second organic particles, thereby further improving the cycling performance and safety of the separator.

In some embodiments, in step (3), the speed for coating can be controlled at 30 m/min-90 m/min, for example, 50 m/min-70 m/min. When the speed for the coating is within the above range, it is helpful to adjust the average height of the protrusions, such that the thickness ratio of the average Height to the inorganic particle layer is controlled in the given range; moreover, the film surface problem of the coating can also be effectively reduced, and the probability of non-uniform coating can be reduced, thereby further improving the cycling performance and safety performance of the battery.

In some embodiments, in step (3), the line speed ratio for coating can be controlled at 0.8-2.5, for example, 0.8-1.5, and 1.0-1.5.

In some embodiments, in step (3), the drying can be carried out at a temperature of 40° C.-70° C., for example, 50° C. to 60° C.

In some embodiments, in step (3), the drying can be carried out for a period of 10 s-120 s, for example, 20 s-80 s, and 20 s-40 s.

By controlling the above process parameters within the given ranges, the operational performance of the separator in the present application can be further improved. Those of ordinary skill in the art can selectively adjust and control one or more of the above process parameters according to the actual production.

In order to further improve the performance of the secondary battery, the inorganic particles and the organic particles also optionally satisfy one or more of the aforementioned parameter conditions. It will not be repeated here.

The above substrate, first organic particles and second organic particles are all commercially available.

In the method for preparing the separator of the present application, the coating is prepared by one-time coating, which greatly simplifies the production process for a separator; meanwhile, the use of the separator prepared by the above method in a battery can effectively improve the cycling performance and safety performance of the battery.

[Positive Electrode Plate]

In a secondary battery, a positive electrode plate generally comprises a positive electrode current collector and a positive electrode film layer provided on the positive electrode current collector, wherein the positive electrode film layer comprises a positive electrode active material.

The positive electrode current collector may be a conventional metal foil or a composite current collector (for example, a composite current collector can be formed by providing a metal material on a polymer substrate). As an example, the positive electrode current collector may be an aluminum foil.

The specific types of the positive electrode active materials are not limited, and active materials known in the art that can be used for the positive electrode of secondary batteries can be used, and the active materials can be selected by a person skilled in the art according to actual requirements.

As an example, the positive electrode active material can include, but is not limited to, one or more of lithium transition metal oxides, lithium-containing phosphates with a olivine structure and the respective modified compounds thereof. An example of the lithium transition metal oxide can include, but is not limited to, one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and the respective modified compounds thereof. An example of the lithium-containing phosphates with a olivine structure can include, but is not limited to, one or more of lithium iron phosphate, a lithium iron phosphate-carbon composite, lithium manganese phosphate, a lithium manganese phosphate-carbon composite, lithium iron manganese phosphate, a lithium iron manganese phosphate-carbon composite and modified compounds thereof. These materials are all commercially available.

In some embodiments, modified compounds of these material can be from the doping modification and/or surface coating modification of the material.

The positive electrode film layer typically also optionally comprises a binder, a conductive agent and other optional auxiliary agents.

As an example, the conductive agent can be one or more of superconducting carbon, acetylene black, carbon black, Ketjen black, carbon dots, carbon nanotubes, Super P (SP), graphene and carbon nanofibers.

As an example, the binder can be one or more of a styrene-butadiene rubber (SBR), a water-based acrylic resin (water-based acrylic resin), polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA) and polyvinyl butyral (PVB).

[Negative Electrode Plate]

In a secondary battery, a negative electrode plate generally comprises a negative electrode current collector and a negative electrode film layer provided on the negative electrode current collector, wherein the negative electrode film layer comprises a negative electrode active material.

The negative electrode current collector may be a conventional metal foil or a composite current collector (for example, a composite current collector can be formed by providing a metal material on a polymer substrate). As an example, the negative electrode current collector may be a copper foil.

The specific types of the negative electrode active materials are not limited, and active materials known in the art that can be used for the negative electrode of secondary batteries can be used, and the active materials can be selected by a person skilled in the art according to actual requirements. As an example, the negative electrode active material can include, but is not limited to, one or more of synthetic graphite, natural graphite, hard carbon, soft carbon, a silicon-based material and a tin-based material. The silicon-based material can be selected from one or more of elemental silicon, a silicon oxide compound (for example, silicon(II) oxide), a silicon-carbon composite, a silicon-nitrogen composite, and a silicon alloy. The tin-based material can be selected from one or more of elemental tin, a tin oxide compound, and a tin alloy. These materials are all commercially available.

In some embodiments, in order to further improve the energy density of the battery, the negative electrode active material can comprise a silicon-based material.

The negative electrode film layer typically also optionally comprises a binder, a conductive agent and other optional auxiliary agents.

As an example, the conductive agent can be one or more of superconducting carbon, acetylene black, carbon black, Ketjen black, carbon dots, carbon nanotubes, graphene and carbon nanofibers.

As an example, the binder can be one or more of a styrene-butadiene rubber (SBR), a water-based acrylic resin (water-based acrylic resin), polyvinylidene fluoride (PVDF), polytetrafluoroethylene (PTFE), an ethylene-vinyl acetate copolymer (EVA), polyvinyl alcohol (PVA) and polyvinyl butyral (PVB).

As an example, other optional auxiliary agents may be a thickening and dispersing agent (for example, sodium carboxymethyl cellulose, CMC-Na), a PTC thermistor material etc.

[Electrolyte]

In the embodiments of the present invention, the selection of the electrolyte is not particularly limited, and it is disposed between the positive electrode plate and the negative electrode plate and functions for ionic conduction. The electrolyte can comprise an electrolyte salt and a solvent.

As an example, the electrolyte salt can be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium bisoxalatodifluorophosphate) and LiTFOP (lithium tetrafluorooxalate phosphate).

As an example, the solvent can be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolyte also comprises an additive. For example, the additive can include a negative electrode film-forming additive, a positive electrode film-forming additive, and also an additive that can improve certain performance of the battery, such as an additive to improve the overcharge performance of a battery, an additive to improve the high temperature performance of a battery, and an additive to improve the low temperature performance of a battery, etc.

In some embodiments, the secondary battery of the present application can be a lithium-ion secondary battery.

Figure 5:
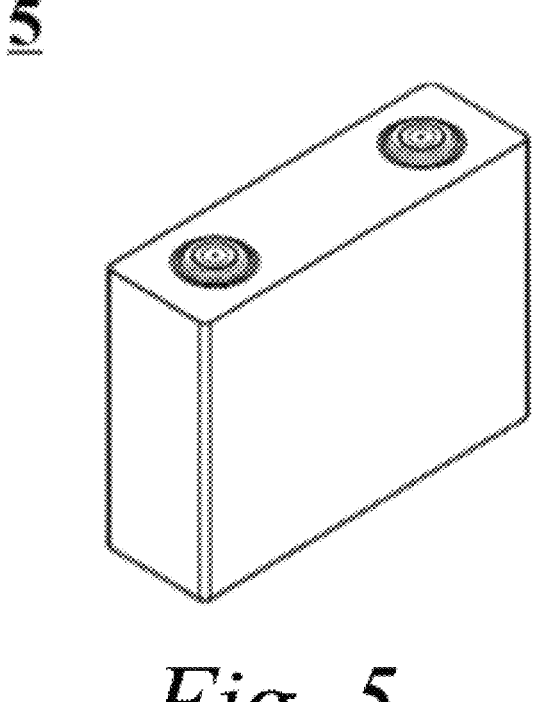
FIG. 5 is a schematic diagram of an embodiment of a secondary battery.

In embodiments of the present application, the shape of the secondary battery is not particularly limited, which can be a cylindrical shape, a prismatic shape or any other shapes. FIG. 5 shows a prismatic secondary battery 5 as an example.

In some embodiments, the secondary battery can comprises an outer package. The outer package is used for packaging the positive electrode plate, the negative electrode plate and the electrolyte.

Figure 6:
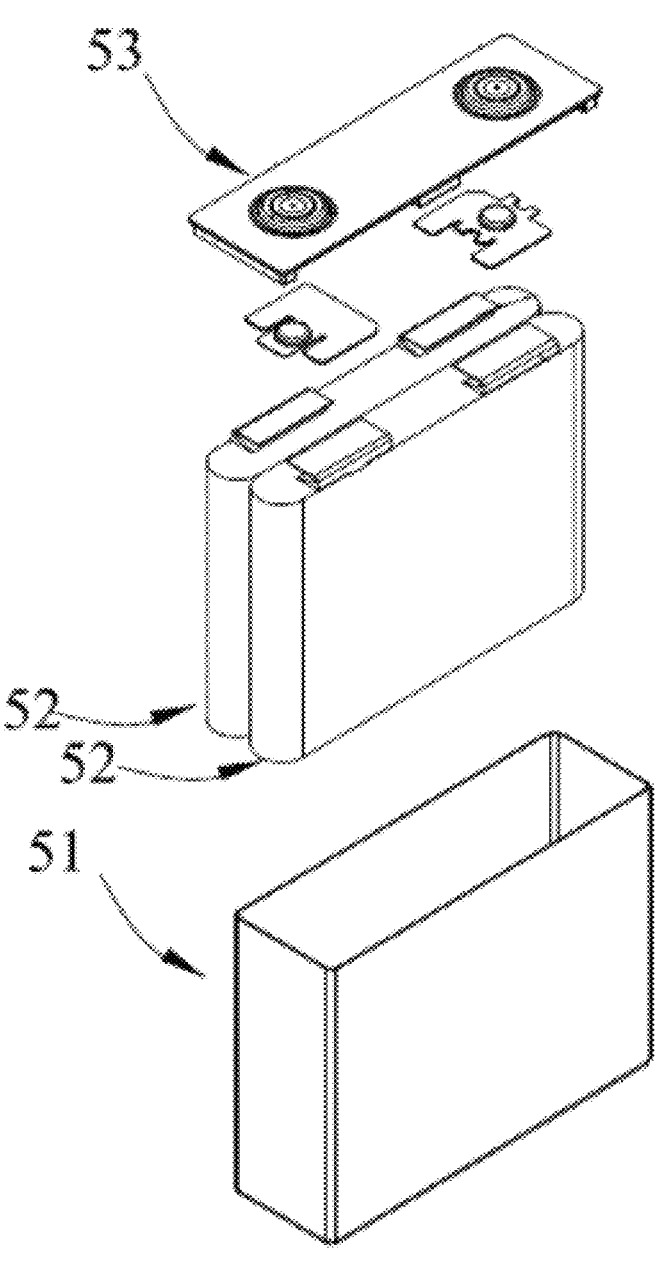
FIG. 6 is an exploded view of FIG. 5.

In some embodiments, referring to FIG. 6, the outer package can include a housing 51 and a cover plate 53, wherein the housing 51 can include a bottom plate and side plates connected to the bottom plate, and the bottom plate and the side plates enclose and form an accommodating cavity. The housing 51 has an opening in communication with the accommodating cavity, and the cover plate 53 can cover the opening to close the accommodating cavity.

The positive electrode plate, the negative electrode plate and the separator can form an electrode assembly 52 by a winding process or a lamination process. The electrode assembly 52 is packaged in the accommodating cavity. The electrolyte is infiltrate into the electrode assembly 52. The number of the electrode assemblies 52 contained in the secondary battery 5 may be one or more, and may be adjusted according to requirements.

In some embodiments, the outer package of the secondary battery can be a hard shell, for example, a hard plastic shell, an aluminum shell, a steel shell, etc. The outer package of the secondary battery can also be a soft bag, such as a pouch-type soft bag. The material of the soft bag can be a plastic, for example, comprising one or more of polypropylene (PP), polybutylene terephthalate (PBT), polybutylene succinate (PBS), etc.

In some embodiments, the secondary battery can be assembled into a battery module, and the number of the secondary batteries contained in the battery module can be multiple, and the specific number can be adjusted according to the application and capacity of the battery module.

Figure 7:
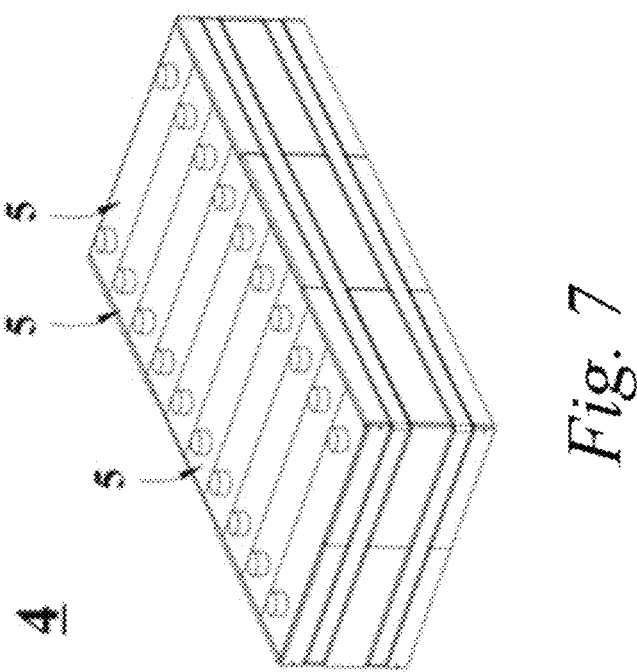
FIG. 7 is a schematic diagram of an embodiment of a battery module.

FIG. 7 shows a battery module 4 as an example. Referring to FIG. 7, in the battery module 4, a plurality of secondary batteries 5 can be provided sequentially in the length direction of the battery module 4. Apparently, the secondary batteries can also be disposed in any other manner. Furthermore, the plurality of secondary batteries 5 can be fixed by fasteners.

In some embodiments, the battery module 4 may also comprise a housing with an accommodating space, and a plurality of secondary batteries 5 are accommodated in the accommodating space.

In some embodiments, the above battery module can also be assembled into a battery pack, and the number of the battery modules contained in the battery pack can be adjusted according to the application and capacity of the battery pack.

Figure 8:
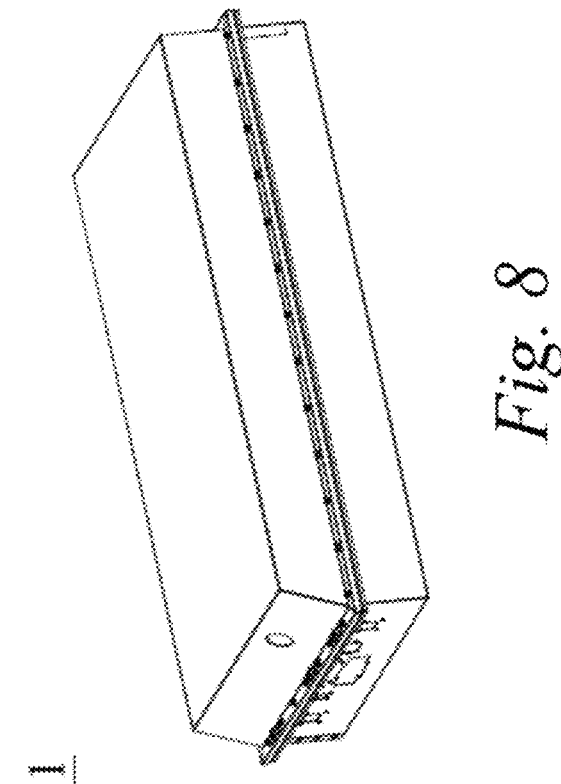
FIG. 8 is a schematic diagram of an embodiment of a battery pack.
Figure 9:
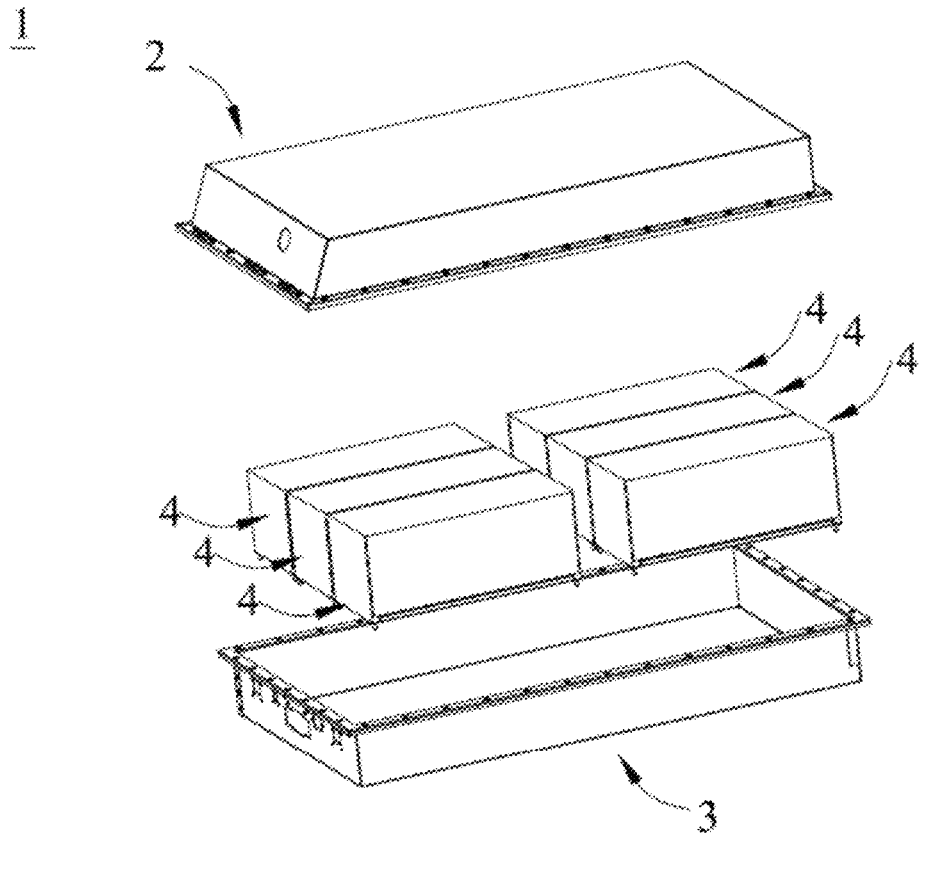
FIG. 9 is an exploded view of FIG. 8.

FIG. 8 and FIG. 9 show a battery pack 1 as an example. Referring to FIG. 8 and FIG. 9, the battery pack 1 can include a battery case and a plurality of battery modules 4 provided in the battery case. The battery case comprises an upper case body 2 and a lower case body 3, wherein the upper case body 2 can cover the lower case body 3 to form a closed space for accommodating the battery modules 4. A plurality of battery modules 4 can be disposed in the battery case in any manner.

[Device]

The present application also provides a device, comprising at least one of the secondary battery, battery module, or battery pack of the present application. The secondary battery, battery module or battery pack can be used as a power source of the device, or as an energy storage unit of the device. The device can be, but not limited to, a mobile device (such as a mobile phone, a laptop computer, etc.), an electric vehicle (such as a battery electric vehicle, a hybrid electric vehicle, a plug-in hybrid electric vehicle, an electric bicycle, an electric scooter, an electric golf cart, an electric truck, etc.), an electric train, a ship, a satellite, an energy storage system, etc.

The device can comprise the secondary battery, the battery module or the battery pack selected according to its use requirements.

Figure 10:
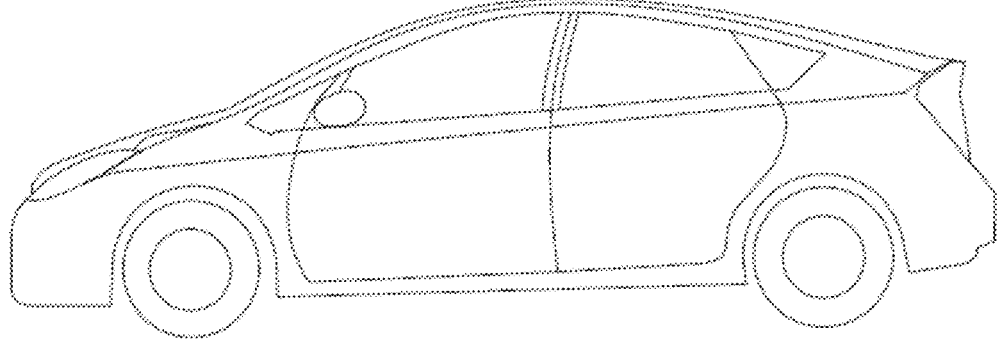
FIG. 10 is a schematic diagram of an embodiment of an device with a secondary battery as a power source.

FIG. 10 shows a device as an example. The device can be a battery electric vehicle, a hybrid electric vehicle, a plug-in hybrid electric vehicle, etc. In order to meet the requirements of the device for a high power and a high energy density of a secondary battery, a battery pack or a battery module can be used.

As another example, the device can be a mobile phone, a tablet computer, a laptop computer, etc. The device is generally required to be thin and light, and a secondary battery can be used as a power source.

The beneficial effects of the present application will be further described below in conjunction with examples.

EXAMPLES

In order to make the technical problems solved by the present application, the technical solutions and the beneficial effects clearer, further detailed description of the present application will be given below with reference to the examples and the accompanying drawings. Apparently, the described embodiments are merely some of the embodiments of the present application, but not all of the embodiments. The following description of at least one exemplary embodiment is merely illustrative in nature and is in no way to limit the present application and the application thereof. All the other embodiments obtained by a person of ordinary skill in the art based on the embodiments of the present application without any creative effort shall fall within the scope of protection of the present application.

I. Preparation of Separator

Raw materials used in the present application are all commercially available:

for example: the substrate can be purchased from Shanghai Enjie New Materials Co., Ltd.;

the inorganic particles can be purchased from Estone Materials Technology Co Ltd.;

the first organic particles can be purchased from Arkema (Changshu) Chemical Co., Ltd.;

the second organic particles can be purchased from Sichuan Indile Technology Co., Ltd.;

the heat-resistant adhesive can be purchased from Sichuan Indile Technology Co., Ltd.;

the wetting agent can be purchased from Dow Chemical Company; and the dispersant can be purchased from Changshu Weiyi Technology Co., Ltd. separator 1:

(1) a PE substrate is provided, for example, the substrate having a thickness of 7 μm, and a porosity of 40%;

(2) formulation of coating slurry: inorganic particles of aluminum oxide ($Al_2O_3$), first organic particles of a vinylidene fluoride-hexafluoropropylene copolymer (with a number average molecular weight of 550000), a heat-resistant adhesive of an acrylic acid-acrylonitrile copolymer, a dispersant of sodium carboxymethyl cellulose (CMC-Na) and a wetting agent of an organosilicon modified polyether are uniformly mixed at a mass ratio of 60:30:8:1.5:0.5 (dry weight ratio) in a solvent of deionized water, to obtain a coating slurry with a solid content of 36% based on the weight of the coating slurry, wherein the inorganic particles of aluminum oxide ($Al_2O_3$) have a volume-average particle size Dv50 of 1 μm, the first organic particles are secondary particles and have a number-average particle size of 15 μm;

(3) the two surfaces of the PE substrate are coated with the coating slurry formulated in step (2) by means of roll coating, followed by drying and slitting procedures, to obtain a separator 1, wherein the gravure roll of the coating machine has a number of lines of 190 LPI, and the coating is carried out at a speed of 60 m/min, and a line speed ratio of 1.2; and the separator has a single-sided coating weight per unit area of 2.3 g/m². in the separator 1, the first organic particles are embedded in the inorganic particle layer and form protrusions on the surface of the inorganic particle layer; and the area coverage of the first organic particles on the coating surface is 10%.

The preparation methods for separators 2-19 and comparative separators 1-3 are similar to that for separator 1, except that: the number-average particle size, type and mass percentage of the first organic particles are adjusted, see Table 1 for details.

The preparation methods for separators 20-33 are similar to that for separator 1, except that: in the coating, second organic particles are further added, and the number-average particle size and types thereof are adjusted, see Table 2 for details.

II. Preparation of Battery

Example 1

1. Preparation of Positive Electrode Plate

A positive electrode active material of $LiNi_{0.5}Co_{0.2}Mn_{0.3}O_2$ (NCM523), a conductive agent of carbon black (Super P), a binder of polyvinylidene fluoride (PVDF) are uniformly mixed at a mass ratio of 96.2:2.7:1.1 in an appropriate amount of a solvent of N-methyl pyrrolidone (NMP), to obtain a positive electrode slurry; then the positive electrode slurry is coated onto a positive electrode current collector of aluminum foil, followed by drying, cold pressing, slitting and cutting procedures, etc., to obtain a positive electrode plate. In some embodiments, the positive electrode plate has a single-side areal density of 0.207 mg/mm², and a compacted density of 3.5 g/cm³.

2. Preparation of Negative Electrode Plate

A negative electrode active material of synthetic graphite, a conductive agent of carbon black (Super P), a binder of a styrene-butadiene rubber (SBR) and sodium carboxymethyl cellulose (CMC-Na) are uniformly mixed at a mass ratio of 96.4:0.7:1.8:1.1 in an appropriate amount of a solvent of deionized water to obtain a negative electrode slurry; then the negative electrode slurry is coated onto a negative electrode current collector of copper foil, followed by drying, cold pressing, slitting and cutting procedures, etc., to obtain a negative electrode plate. In some embodiments, the negative electrode plate has a single-side areal density of 0.126 mg/mm², and a compacted density of 1.7 g/cm³.

3. Separator

The separator is a separator 1 prepared above.

4. Preparation of Electrolyte

Ethylene carbonate (EC) and ethyl methyl carbonate (EMC) at a mass ratio of 30:70 are mixed, to obtain an organic solvent; then a fully dried electrolyte salt of $LiPF_6$ is dissolved in the above mixed solvent, with an electrolyte salt concentration of 1.0 mol/L, and uniformly mixed to obtain an electrolyte.

5. Preparation of Secondary Battery

The positive electrode plate, the separator, and the negative electrode plate are laminated in sequence, such that the separator is located between the positive electrode plate and the negative electrode plate and functions for separation, and then they are wound to obtain an electrode assembly; the electrode assembly is placed in an outer package; the electrolyte prepared above is injected into the dried secondary battery, followed by vacuum packaging, leaving to stand, formation, and shaping procedures, etc., to obtain a secondary battery.

The preparation methods for the secondary batteries in examples 2-33 and comparative examples 1-3 are similar to that for the secondary battery in example 1, except that different separators are used, see Table 1 and Table 2 for details.

III. Battery Performance Test

1. Cycling Performance at 45° C.

At 45° C., the secondary batteries prepared in the examples and comparative examples are charged at a constant current rate of 1 C to an end-of-charge voltage of 4.2 V, then charged at a constant voltage to a current of ≤0.05 C, left to stand for 30 min, then discharged at a constant current rate of 0.33 C to an end-of-discharge voltage of 2.8 V, and left to stand for 30 min; the battery capacity of C0 at this time is recorded. The battery is charged and discharged for 1500 cycles according to this method, and the battery capacity after 1500 cycles is recorded as C1.

The cycling capacity retention rate of the battery at 45° C.=C1/C0×100%

2. Thermal Propagation Performance

At 25° C., the secondary batteries prepared in the examples and comparative examples are charged at a constant current rate of 1 C to an end-of-charge voltage of 4.2 V, then charged at a constant voltage to a current of ≤0.05 C, and left to stand for 10 min; then a metal heating plate is tightly attached onto the surface of the battery, the battery is clamped with a fixture at a location where the battery does not come into contact with the heating plate, with a 3 mm thermal insulation pad being sandwiched between the fixture and the battery, and heated at a constant temperature of 200° C. until a thermal runaway of the battery occurs; The time at which the thermal runaway of the battery occurs is recorded.

3. Crack SOH Performance Test

At 25° C., the secondary batteries prepared in the examples and comparative examples are charged at a constant current rate of 0.5 C to an end-of-charge voltage of 4.25 V, then charged at a constant voltage to a current of ≤0.05 C, left to stand for 30 min, then discharged at a constant current rate of 0.33 C to an end-of-discharge voltage of 2.8 V, and left to stand for 30 min; the battery capacity of C0 at the moment is recorded.

According to this method, the battery is tested for cyclic charge and discharge; when the battery capacity is faded by 1% on the basis of C0, the battery is tested by X-ray CT (X-ray computed tomography); when a breakage occurred at a corner of the positive electrode plate or negative electrode plate of the battery is observed, the battery capacity C1 at the moment is recorded.

Crack SOH=C1/C0×100%

The tested battery performance of the examples and comparative examples is given in Tables 1 and 2.

TABLE 1

| | No. | First organic particle Type | First organic particle Morphology | Number-average particle size/μm | Mass ratio of components in coating Inorganic particle:first organic particle:heat-resistance adhesive:dispersant:wetting agent | Area coverage of first organic particle on coating surface/% | Battery performance Cycling capacity retention rate after 1500 cycles | Thermal propagation time | Crack SOH/% |
|---|---|---|---|---|---|---|---|---|---|
| Example 1 | Separator 1 | Vinylidene fluoride-hexafluoropropylene copolymer | Secondary particle | 15.0 | 60:30:8:1.5:0.5 | 10.0 | 88.2 | 515 | 61.7 |
| Example 2 | Separator 2 | Vinylidene fluoride-hexafluoropropylene copolymer | Secondary particle | 15.0 | 62:28:8:1.5:0.5 | 8.5 | 88.5 | 523 | 62.0 |
| Example 3 | Separator 3 | Vinylidene fluoride-hexafluoropropylene copolymer | Secondary particle | 15.0 | 65:25:8:1.5:0.5 | 7.8 | 88.9 | 535 | 62.2 |
| Example 4 | Separator 4 | Vinylidene fluoride-hexafluoropropylene copolymer | Secondary particle | 15.0 | 68:22:8:1.5:0.5 | 6.5 | 89.1 | 539 | 63.8 |
| Example 5 | Separator 5 | Vinylidene fluoride-hexafluoropropylene copolymer | Secondary particle | 15.0 | 70:20:8:1.5:0.5 | 5.0 | 91.7 | 559 | 65.1 |
| Example 6 | Separator 6 | Vinylidene fluoride-hexafluoropropylene copolymer | Secondary particle | 15.0 | 72:18:8:1.5:0.5 | 4.2 | 89.2 | 508 | 67.7 |
| Example 7 | Separator 7 | Vinylidene fluoride-hexafluoropropylene copolymer | Secondary particle | 15.0 | 75:15:8:1.5:0.5 | 3.7 | 87.9 | 512 | 69.9 |
| Example 8 | Separator 8 | Vinylidene fluoride-hexafluoropropylene copolymer | Secondary particle | 15.0 | 77:13:8:1.5:0.5 | 2.5 | 86.1 | 490 | 71.1 |
| Example 9 | Separator 9 | Vinylidene fluoride-hexafluoropropylene copolymer | Secondary particle | 15.0 | 78:12:8:1.5:0.5 | 2.0 | 86.0 | 461 | 71.9 |
| Example 10 | Separator 10 | Vinylidene fluoride-hexafluoropropylene copolymer | Secondary particle | 15.0 | 80:10:8:1.5:0.5 | 1.5 | 84.1 | 433 | 73.7 |
| Example 11 | Separator 11 | Vinylidene fluoride-hexafluoropropylene copolymer | Secondary particle | 13.0 | 70:20:8:1.5:0.5 | 3.9 | 82.9 | 374 | 68.2 |
| Example 12 | Separator 12 | Vinylidene fluoride-hexafluoropropylene copolymer | Secondary particle | 16.5 | 70:20:8:1.5:0.5 | 5.5 | 84.7 | 365 | 65.3 |
| Example 13 | Separator 13 | Vinylidene fluoride-hexafluoropropylene copolymer | Secondary particle | 17.3 | 70:20:8:1.5:0.5 | 6.1 | 86.4 | 371 | 65.7 |
| Example 14 | Separator 14 | Vinylidene fluoride-hexafluoropropylene copolymer | Secondary particle | 18.5 | 70:20:8:1.5:0.5 | 7.2 | 84.7 | 337 | 63.9 |
| Example 15 | Separator 15 | Vinylidene fluoride-hexafluoropropylene copolymer | Secondary particle | 20.2 | 70:20:8:1.5:0.5 | 8.8 | 82.5 | 431 | 61.3 |
| Example 16 | Separator 16 | Vinylidene fluoride-hexafluoropropylene copolymer | Secondary particle | 22.5 | 70:20:8:1.5:0.5 | 10.6 | 81.2 | 421 | 60.9 |

TABLE 1-continued

| | | | | | Separator | | Battery performance | | |
| | | | First organic particle | | | Mass ratio of components in coating Inorganic particle:first organic particle:heat-resistance adhesive:disper-sant:wetting agent | Area coverage of first organic particle on coating surface/% | Cycling capacity retention rate after 1500 cycles | Thermal propagation time | Crack SOH/% |
| | No. | Type | Morphology | Number-average particle size/μm | | | | | |
| Example 17 | Separator 17 | Vinylidene fluoride-hexafluoropropylene copolymer | Secondary particle | 24.8 | 70:20:8:1.5:0.5 | 13.7 | 79.4 | 313 | 58.1 |
| Example 18 | Separator 18 | Vinylidene fluoride-hexafluoropropylene copolymer | Secondary particle | 26.5 | 70:20:8:1.5:0.5 | 14.1 | 76.9 | 284 | 56.4 |
| Example 19 | Separator 19 | Vinylidene fluoride-hexafluoropropylene copolymer | Secondary particle | 15.0 | 70:20:8:1.5:0.5 | 4.7 | 82.7 | 261 | 57.8 |
| Comparative example 1 | Comparative separator 1 | Vinylidene fluoride-hexafluoropropylene copolymer | Secondary particle | 7.0 | 70:20:8:1.5:0.5 | 1.5 | 76.9 | 313 | 73.5 |
| Comparative example 2 | Comparative separator 2 | Vinylidene fluoride-hexafluoropropylene copolymer | Secondary particle | 0.5 | 70:20:8:1.5:0.5 | 0.0 | 66.4 | 284 | 82.1 |
| Comparative example 3 | Comparative separator 3 | Vinylidene fluoride-hexafluoropropylene copolymer | Secondary particle | 15 | 50:40:8:1.5:0.5 | 15.0 | 70.7 | 103 | 65.9 |

TABLE 2

| | | | Separator | | | | |
| | | First organic particle | | | Second organic particle | | |
| | No. | Type | Morphology | Number average particle size/μm | Type | Morphology | Number-average particle size/μm |
| Example 20 | Separator 20 | Vinylidene fluoride-hexafluoro-propylene copolymer | Secondary particle | 15.0 | Butyl methacrylate-isooctyl acrylate-styrene copolymer | Primary particle | 2.0 |
| Example 21 | Separator 21 | Vinylidene fluoride-hexafluoro-propylene copolymer | Secondary particle | 15.0 | Butyl methacrylate-isooctyl acrylate-styrene copolymer | Primary particle | 2.5 |
| Example 22 | Separator 22 | Vinylidene fluoride-hexafluoro-propylene copolymer | Secondary particle | 15.0 | Butyl methacrylate-isooctyl acrylate-styrene copolymer | Primary particle | 3.5 |
| Example 23 | Separator 23 | Vinylidene fluoride-hexafluoro-propylene copolymer | Secondary particle | 15.0 | Butyl methacrylate-isooctyl acrylate-styrene copolymer | Primary particle | 4.5 |

TABLE 2-continued

| Example 24 | Separator 24 | Vinylidene fluoride-hexafluoro-propylene copolymer | Secondary particle | 15.0 | Butyl methacrylate-isooctyl acrylate-styrene copolymer | Primary particle | 5.0 |
| Example 25 | Separator 25 | Vinylidene fluoride-hexafluoro-propylene copolymer | Secondary particle | 15.0 | Butyl methacrylate-isooctyl acrylate-styrene copolymer | Primary particle | 5.5 |
| Example 26 | Separator 26 | Vinylidene fluoride-hexafluoro-propylene copolymer | Secondary particle | 15.0 | Butyl methacrylate-isooctyl acrylate-styrene copolymer | Primary particle | 6.0 |
| Example 27 | Separator 27 | Vinylidene fluoride-hexafluoro-propylene copolymer | Secondary particle | 15.0 | Butyl methacrylate-isooctyl acrylate-styrene copolymer | Primary particle | 7.0 |
| Example 28 | Separator 28 | Vinylidene fluoride-hexafluoro-propylene copolymer | Secondary particle | 15.0 | Butyl methacrylate-isooctyl acrylate-styrene copolymer | Primary particle | 3.0 |
| Example 29 | Separator 29 | Vinylidene fluoride-hexafluoro-propylene copolymer | Secondary particle | 15.0 | Butyl methacrylate-isooctyl acrylate-styrene copolymer | Primary particle | 5.0 |
| Example 30 | Separator 30 | Vinylidene fluoride-hexafluoro-propylene copolymer | Secondary particle | 15.0 | Butyl methacrylate-isooctyl acrylate-styrene copolymer | Primary particle | 5.0 |
| Example 31 | Separator 31 | Vinylidene fluoride-hexafluoro-propylene copolymer | Secondary particle | 15.0 | Butyl methacrylate-isooctyl acrylate-styrene copolymer | Primary particle | 5.0 |
| Example 32 | Separator 32 | Vinylidene fluoride-hexafluoro-propylene copolymer | Secondary particle | 15.0 | Butyl methacrylate-isooctyl acrylate-styrene copolymer | Primary particle | 5.0 |

| | | Separator | | | Battery performance | | |
| | No. | Mass ratio of components in coating Inorganic particle:first organic particle:second organic particle:heat-resistance adhesive:disper-sant:wetting agent | Area coverage of first organic particle to coating surface/% | Area coverage of second organic particle on coating surface/% | Cycling capacity retention rate/% after 1500 cycles | Thermal propagation time/% | Crack SOH/% |
|---|---|---|---|---|---|---|---|
| Example 20 | Separator 20 | 70:20:4:4:1.5:0.5 | 5 | 0.4 | 86.2 | 530 | 74.9 |
| Example 21 | Separator 21 | 70:20:4:4:1.5:0.5 | 5 | 0.8 | 82.5 | 541 | 72.1 |
| Example 22 | Separator 22 | 70:20:4:4:1.5:0.5 | 5 | 1.5 | 89.9 | 537 | 69.3 |
| Example 23 | Separator 23 | 70:20:4:4:1.5:0.5 | 5 | 2 | 91.1 | 539 | 67.3 |
| Example 24 | Separator 24 | 70:20:4:4:1.5:0.5 | 5 | 2.5 | 92.2 | 561 | 65.6 |
| Example 25 | Separator 25 | 70:20:4:4:1.5:0.5 | 5 | 2 | 89.7 | 550 | 65.7 |
| Example 26 | Separator 26 | 70:20:4:4:1.5:0.5 | 5 | 4 | 88.2 | 508 | 65.9 |

TABLE 2-continued

| Example 27 | Separator 27 | 70:20:4:4:1.5:0.5 | 5 | 3 | 86.7 | 502 | 63.8 |
| Example 28 | Separator 28 | 70:20:4:4:1.5:0.5 | 5 | 1.2 | 88.6 | 527 | 66.3 |
| Example 29 | Separator 29 | 70:20:4:4:1.5:0.5 | 5 | 2.5 | 88 | 543 | 68.5 |
| Example 30 | Separator 30 | 70:22:2:4:1.5:0.5 | 6.5 | 2.0 | 88.2 | 530 | 70.6 |
| Example 31 | Separator 31 | 70:16:6:4:1.5:0.5 | 4.2 | 3.0 | 87.3 | 538 | 67.6 |
| Example 32 | Separator 32 | 70:16:8:4:1.5:0.5 | 3.8 | 4.0 | 89.5 | 521 | 65.6 |

It can be seen from Table 1 that, the secondary batteries comprising the separator of the present application all achieve excellent improvements in terms of cycling capacity retention rate, thermal propagation performance and Crack SOH; for example, the cycling capacity retention rate of the resulting secondary battery after 1500 cycles can be up to 91.7%, the thermal propagation performance of the secondary battery can be up to 559 seconds, and the Crack SOH value can be up to 70%. In the case of using the first organic particles alone, in comparative examples 1 and 2 where the particles having a particle size of less than 13 μm is used, the cycling capacity retention rate and thermal propagation time of the secondary battery are worse than those of the secondary battery comprising the separator of the present application. Meanwhile, even if the first organic particles having a number-average particle size within the range of the present invention is used, if the mass percentage thereof in the separator is too high, this will result in a reduction in terms of both the cycling performance and safety performance of the resulting secondary battery, see comparative example 3.

It can be seen from FIG. 2 that, by further adding second organic particles with a specific number-average particle size and of a specific type in a specific amount, the resulting separator still satisfy the requirements for the secondary battery in terms of safety performance and cycling performance.

The present inventors also did experiments by using the inorganic particles, the first organic particles and the second organic particles falling within the range of the present application, but in other amounts and with other materials, other substrates, other coating process parameters and other process conditions, and obtained similar improvements in terms of cycling performance and safety performance of the batteries to those in examples 1-32.

Described above are merely specific embodiments of the present application, and the scope of protection of the present application is not limited thereto; any equivalent modification or replacement can be readily conceived by a person skilled in the art according to the technical range of the disclosure of the present application, and shall fall within the protection scope of the present application. Therefore, the scope of protection of the present application shall be determined by the claims.

What is claimed is:

1. A separator, comprising:

a substrate; and a coating provided on at least one surface of the substrate; wherein the coating comprises inorganic particles and organic particles, the inorganic particles form an inorganic particle layer, the organic particles comprise first organic particles and second organic particles, the first organic particles and the second organic particles are embedded in the inorganic particle layer and forming protrusions on a surface of the inorganic particle layer;

the first organic particles have a number-average particle size of 13 μm to 25 μm, and an area coverage of the first organic particles on a surface of the coating of ≤10%; the second organic particles have a number-average particle size of 2 μm-8 μm; and a mass percentage of the second organic particles in the coating is less than a mass percentage of the first organic particles in the coating; a ratio of the area coverage of the first organic particles on the coating surface to an area coverage of the second organic particles on the coating surface is more than 1:1 and less than or equal to 20:1.

2. The separator according to claim 1, wherein the area coverage of the first organic particles on the coating surface is 0.5%-8%.

3. The separator according to claim 1, wherein the first organic particles have a number-average particle size of 15 μm-25 μm.

4. The separator according to claim 1, wherein the first organic particles comprise one or more of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and modified compounds of these homopolymers or copolymers.

5. The separator according to claim 1, wherein a mass percentage of the inorganic particles in the coating is ≤80%.

6. The separator according to claim 1, wherein the first organic particles and the inorganic particles are formed from a same coating slurry;

a portion of the first organic particles is concentrated on a top portion of the coating without touching a surface of the substrate; and a portion of the inorganic particles is concentrated on a bottom portion of the coating close to the substrate.

7. The separator according to claim 1, wherein the second organic particles have a number-average particle size of 2.5 μm-6 μm.

8. The separator according to claim 1, wherein the mass percentage of the first organic particles in the coating is ≥12%;

the mass percentage of the second organic particles in the coating is ≤8%.

9. The separator according to claim 1, wherein a sum of the area coverages of the first organic particles and the second organic particles on the coating surface is ≤15%.

10. The separator according to claim 1, wherein the ratio of the area coverage of the first organic particles on the coating surface to the area coverage of the second organic particles on the coating surface is 2:1-10:1.

11. The separator according to claim 1, wherein the inorganic particles comprise one or more of boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$).

12. The separator according to claim 1, wherein the separator satisfies one or more of the following (1)-(5):

(1) the separator has an air permeability of 100 s/100 mL-300 s/100 mL;

(2) the separator has a transverse tensile strength (MD) of 1500 kgf/cm²-3000 kgf/cm²;

(3) the separator has a longitudinal tensile strength (TD) of 1000 kgf/cm²-2500 kgf/cm²;

(4) the separator has a transverse elongation at break of 50%-200%; and (5) the separator has a longitudinal elongation at break of 50%-200%.

13. The separator according to claim 1, wherein the inorganic particles and the organic particles form a non-uniform pore structure in the coating.

14. The separator according to claim 1, wherein a spacing between any two adjacent inorganic particles is denoted as L1, and a spacing between any inorganic particle and an adjacent organic particle is denoted as L2, with L1<L2.

15. A method for preparing a separator the method comprising:

(1) providing a substrate;

(2) providing a coating slurry, the coating slurry comprising a component material and a solvent, wherein the component material comprises inorganic particles and organic particles, and the organic particles comprise first organic particles and second organic particles; and (3) coating at least one side of the substrate from step (1) with the coating slurry from step (2), so as to form a coating, and drying the same to obtain the separator;

wherein the separator comprises the substrate and the coating the first organic particles and the second organic particles, the inorganic particles form an inorganic particle layer, the first organic particles and the second organic particles are embedded in the inorganic particle layer and form protrusions on a surface of the inorganic particle layer;

the first organic particles are secondary particles and have a number-average particle size from 13 μm to 25 μm, and an area coverage on a surface of the coating of ≤10%, a ratio of the area coverage of the first organic particles on the coating surface to the area coverage of the second organic particles on the coating surface is more than 1:1 and less than or equal to 20:1, the second organic particles have a number-average particle size of 2 μm-8 μm, a mass percentage of the second organic particles in the coating is less than a mass percentage of the first organic particles in the coating.

16. The preparation method according to claim 15, wherein the second organic particles are in a mass percentage of 8% or less of a total dry weight of the component material.

17. The preparation method according to claim 15, wherein the method satisfies one or more of the following (1)-(7):

(1) in step (2), the first organic particles are in a mass percentage of 12% or more of a total dry weight of the component material;

(2) in step (2), the coating slurry has a solid content of 28%-45% based on a weight of the coating slurry;

(3) in step (3), the coating is carried out by using a coating machine, wherein the coating machine comprises a gravure roller which has a number of lines of 100 LPI-300 LPI;

(4) in step (3), the coating is carried out at a speed of 30 m/min-90 m/min;

(5) in step (3), the coating is carried out at a line speed ratio of 0.8-2.5;

(6) in step (3), the drying is carried out at a temperature of 40° C. to 70° C.; and (7) in step (3), the drying is carried out for a period of 10 s-120 s.

18. A secondary battery, comprising a separator according to claim 1.

19. The separator according to claim 1, wherein the first organic particles are secondary particles having a secondary particle morphology, or the second organic particles are primary particles having a primary particle morphology.

20. The separator according to claim 1, wherein the mass percentage of the first organic particles in the coating is 15% to 25%; and the mass percentage of the second organic particles in the coating is 2% to 8%.

21. The separator according to claim 1, wherein the second organic particles comprise at least one of a copolymer of an acrylate monomeric unit and a styrene monomeric unit, and a copolymer of an acrylate monomeric unit, an acrylic acid monomeric unit, and a styrene monomeric unit, the acrylate monomeric unit comprising at least one of an isooctyl acrylate unit or an isooctyl methacrylate unit, the acrylic acid monomeric unit comprising at least one of an acrylic acid or a methacrylic acid unit.

22. The separator according to claim 21, wherein the copolymer of the second organic particles comprises one or more selected from a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, and a butyl methacrylate-isooctyl acrylate-styrene copolymer.

23. The separator according to claim 22, wherein the copolymer of the second organic particles comprises a methacrylate-methacrylic acid-styrene copolymer.

\* \* \* \* \*